US007413513B2

United States Patent
Nguyen et al.

(10) Patent No.: US 7,413,513 B2
(45) Date of Patent: Aug. 19, 2008

(54) APPARATUS AND METHODS FOR WIRELESS GAMING COMMUNICATIONS

(75) Inventors: Binh T. Nguyen, Reno, NV (US); Craig A. Paulsen, Reno, NV (US); James Stockdale, Clio, CA (US); David Muir, Newcastle (AU)

(73) Assignee: IGT, Reno, NV (US)

( * ) Notice: Subject to any disclaimer, the term of this patent is extended or adjusted under 35 U.S.C. 154(b) by 594 days.

(21) Appl. No.: 10/937,990

(22) Filed: Sep. 10, 2004

(65) Prior Publication Data

US 2006/0058102 A1 Mar. 16, 2006

(51) Int. Cl.
*A63F 13/00* (2006.01)

(52) U.S. Cl. ........................................................ 463/39

(58) Field of Classification Search .................. 463/35, 463/26, 39, 40, 41, 42

See application file for complete search history.

(56) References Cited

U.S. PATENT DOCUMENTS

| | | | | |
|---|---|---|---|---|
| 6,524,189 | B1 * | 2/2003 | Rautila | 463/40 |
| 6,628,939 | B2 | 9/2003 | Paulsen | 455/414 |
| 6,682,421 | B1 * | 1/2004 | Rowe et al. | 463/25 |
| 6,708,176 | B2 | 3/2004 | Strunk et al. | 707/10 |
| 6,846,238 | B2 * | 1/2005 | Wells | 463/39 |
| 2002/0165758 | A1 | 11/2002 | Hind et al. | 705/10 |
| 2003/0054881 | A1 | 3/2003 | Hedrick et al. | 463/29 |
| 2003/0104865 | A1 * | 6/2003 | Itkis et al. | 463/39 |
| 2003/0148812 | A1 | 8/2003 | Paulsen et al. | 463/42 |
| 2003/0176218 | A1 | 9/2003 | LeMay et al. | 463/25 |
| 2003/0232647 | A1 | 12/2003 | Moser | 463/29 |

FOREIGN PATENT DOCUMENTS

| | | |
|---|---|---|
| EP | 1291830 | 3/2003 |
| WO | WO95/31264 | 11/1995 |
| WO | WO03/055183 | 7/2003 |

OTHER PUBLICATIONS

International Search Report and Written Opinion dated Jan. 18, 2006 for International application No. PCT/US2005/032483, filed on Sep. 8, 2005.

(Continued)

*Primary Examiner*—Robert E Pezzuto
*Assistant Examiner*—Manjot K Dhillon
(74) *Attorney, Agent, or Firm*—Weaver Austin Villeneuve & Sampson LLP

(57) ABSTRACT

A gaming communication apparatus may include a wireless transceiver and a controller operatively coupled to the wireless transceiver. The controller may be programmed to establish a bidirectional wireless communication link with a gaming apparatus when in proximity to the gaming apparatus, receive a voice command relating to a first gaming function, transmit first gaming function data to the gaming apparatus via the wireless transceiver, and receive data relating to a second gaming function from the gaming apparatus via the wireless transceiver. The gaming apparatus may include a second wireless transceiver and a second controller operatively coupled to the second wireless transceiver. The second controller may be programmed to receive the first gaming function data via the second wireless transceiver, execute a first gaming function based on the first gaming function data, and transmit the second gaming function data to the wireless communication device via the second wireless transceiver.

68 Claims, 25 Drawing Sheets

OTHER PUBLICATIONS

Devanie Angel, "Fear the chip, *Is RFID the ingenious radiowave of the future, or the beginning of an Orwellian end*", Dec. 8, 2005, Reno News and Review Cover story. http://www.newsreview.com/issues/reno/2005-12-08/cover.asp.

Devanie Angel, "Tracking the trackers, *Patents reveal companies' plans for RFID*", Dec. 8, 2005, Reno News and Review Cover story sidebar. http://www.newsreview.com/issues/reno/2005-12-08/sidebar.asp.

* cited by examiner

FIG. B

APPARATUS AND METHODS FOR WIRELESS GAMING COMMUNICATIONS

BACKGROUND

This patent is directed to a wireless casino gaming communication device for communication with a gaming unit, which could be either an individual gaming unit or a casino gaming system having a plurality of gaming units.

A gaming apparatus of the type used in casinos has included a display unit such as a video display unit or a set of mechanical slot machine reels, a value input device such as a coin slot or paper currency reader, and a controller operatively coupled to the display unit and the value input device and having a processor and a memory operatively coupled to the processor. The controller was programmed to control the overall functions of the gaming machine, including generating game displays representing one or more of a number of casino games, such as poker, blackjack, slots, keno or bingo.

U.S. Patent Application Publication No. 2003/0176218 to LeMay et al. discloses a player tracking system that may use a smart card, electronic token or magnetically striped cards as an authentication instrument. The authentication instrument may be input to a gaming machine to authenticate and provide an audit trail. U.S. Patent Application Publication No. 2003/0054881 to Hedrick et al. discloses a wireless remote control and interface in communication with a player tracking unit to convey gaming information. U.S. Patent Application Publication No. 2003/0232647 to Moser discloses a player tracking system that may use radio frequency identification (RFID) to locate and track a player's activities. When the RFID is within receiving range of a gaming machine, the gaming machine transmits an identification query causing the RFID to broadcast the radio identification. U.S. Patent Application Publication No. 2003/0148812 to Paulsen et al. discloses a wireless player tracking system that uses a global positioning system to locate a player and receive player data via a wireless device carried by a player, such as a cell phone, personal digital assistant or RFID. U.S. Pat. No. 6,628,939 to Paulsen discloses a wireless personal gaming device with a display screen that may wirelessly receive game data from a gaming system and display a game.

SUMMARY OF THE INVENTION

In one aspect, the invention is directed to a gaming system which may include a wireless communication device and a gaming apparatus. The wireless communication device may include a first wireless transceiver and a first controller operatively coupled to the first wireless transceiver. The first controller may include a first processor and a first memory operatively coupled to the first processor. The first controller may be programmed to establish a bidirectional wireless communication link with the gaming apparatus when in proximity to the gaming apparatus, to receive a voice command relating to a first gaming function, to transmit data relating to the first gaming function to the gaming apparatus via the first wireless transceiver, and to receive data relating to a second gaming function from the gaming apparatus via the first wireless transceiver. The gaming apparatus may include a display unit, a second wireless transceiver and a second controller operatively coupled to the display unit and the second wireless transceiver. The second controller may include a second processor and a second memory operatively coupled to the second processor. The second controller may be programmed to receive the first gaming function data via the second wireless transceiver, to execute a first gaming function based on the first gaming function data, to transmit the second gaming function data to the wireless communication device via the second wireless transceiver, to cause the display unit to generate a game display, and to determine a value payout associated with an outcome of the game. The game display may relate to poker, blackjack, slots, keno or bingo.

In another aspect, the invention is directed to a gaming apparatus which may include a display unit, a value input device, a wireless transceiver, and a controller operatively coupled to the display unit, the value input device and the wireless transceiver. The controller may include a processor and a memory operatively coupled to the processor. The controller may be programmed to establish a bidirectional wireless communication link with a wireless communication apparatus, when in proximity to the wireless communication apparatus, to receive data relating to a first gaming function from the wireless communication device via the wireless transceiver, to execute a first gaming function in response to the first gaming function data, to transmit data relating to a second gaming function to the wireless communication device via the wireless transceiver, to cause the display unit to generate a game display, and to determine a value payout associated with an outcome of the game. The first gaming function data may relate to a voice command. The game display may relate to poker, blackjack, slots, keno or bingo.

In yet another aspect, the invention is directed to a gaming communication apparatus which may include a microphone, a wireless transceiver and a controller operatively coupled to the microphone and the wireless transceiver. The controller may include a processor and a memory operatively coupled to the processor. The controller may be programmed to establish a bidirectional wireless communication link with a gaming apparatus when in proximity to the gaming apparatus, to receive a voice command relating to a first gaming function, to transmit data relating to the first gaming function to the gaming apparatus via the wireless transceiver, and to receive data relating to a second gaming function from the gaming apparatus via the wireless transceiver.

In a yet a further aspect, the invention is directed to a gaming communication method which may include establishing a bidirectional wireless communication link with a first wireless transceiver when in proximity to the first wireless transceiver, receiving a voice command relating to a first gaming function, executing a function in response to the voice command, transmitting data relating to a first gaming function to the first wireless transceiver via a second wireless transceiver, and receiving data relating to a second gaming function via the second wireless transceiver.

Additional aspects of the invention are defined by the claims of this patent.

BRIEF DESCRIPTION OF THE DRAWINGS

FIG. 4B is a perspective view an alternative embodiment the wireless communication device shown schematically in FIG. 1;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
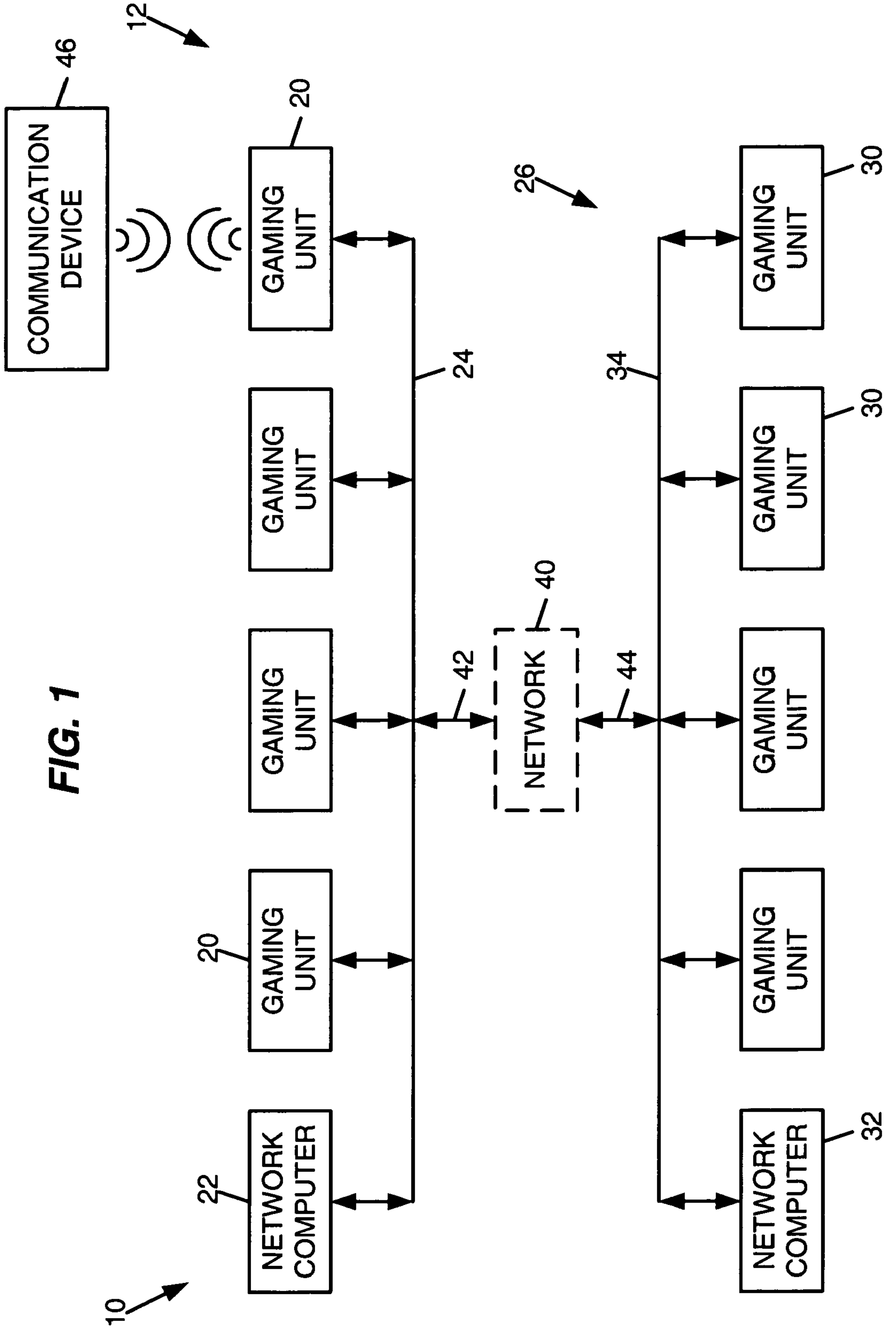
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44. The casino gaming system 10 may further include several wireless communication devices 46 capable of bidirectional wireless communication with the gaming units 20, 30 or the network computers 22, 32. Although only one wireless communication device 46 is shown, it should be understood that multiple wireless communication devices 46 may be used, including a wireless communication device 46 for each player in the casino.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Figure 2:
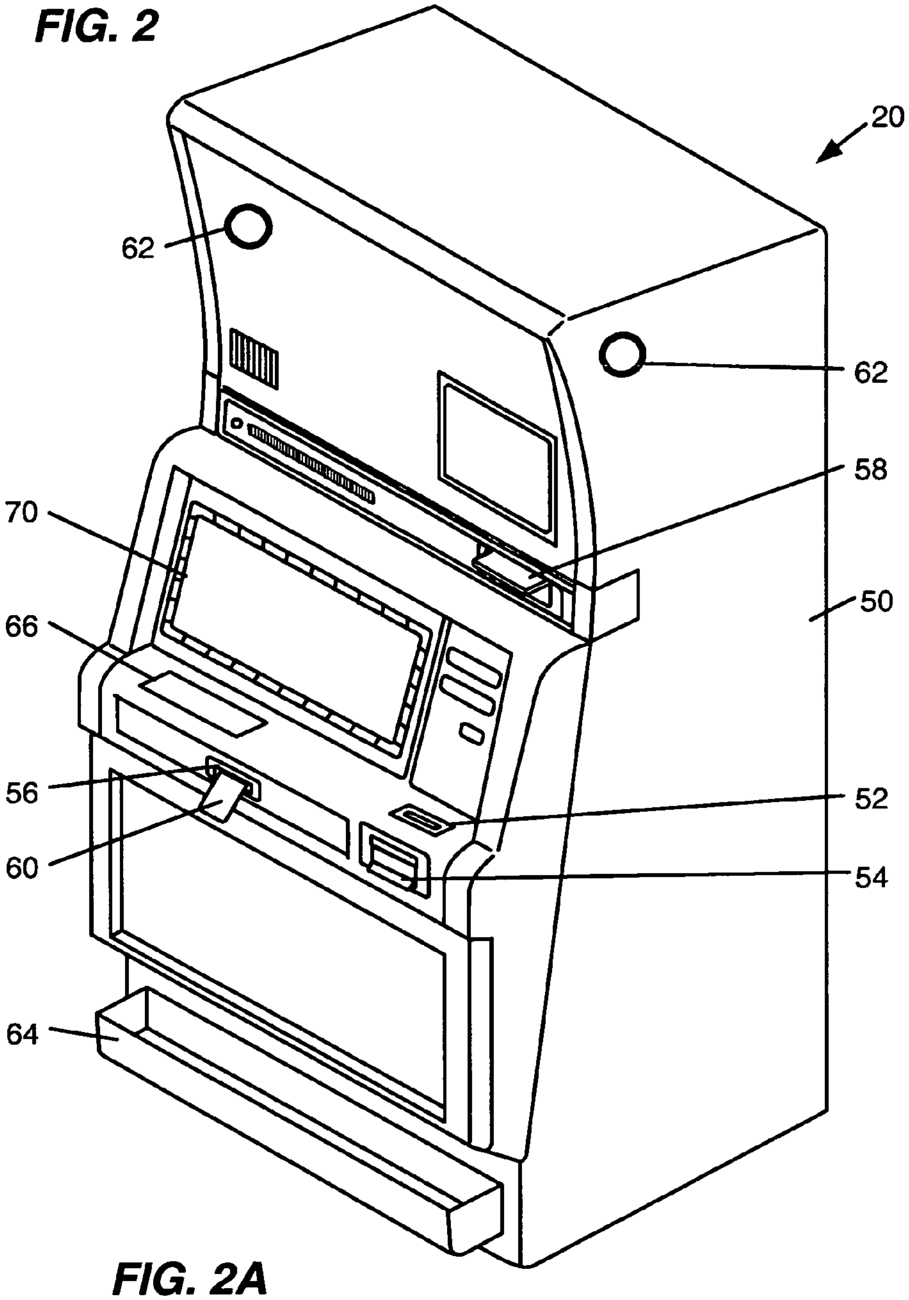
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56, a card reader 58 and a wireless transceiver (not shown) which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc. In addition to, or as an alternative to, the card reader 58, a wireless transceiver may be provided. The wireless transceiver may include any type of communication device capable of wireless bidirectional radio communication with a wireless communication device, such as Bluetooth device or other wireless personal area network (WPAN) device, a cellular device, wireless fidelity (WiFi) or other wireless local area network (WLAN) device, etc. Although the wireless bidirectional communication may include any wireless technology, in one example short range radio links, such as a WPAN, may be utilized to maintain wireless transmissions between the gaming unit 20 and the wireless communication device, rather than broadcast the wireless transmissions over a broader area (e.g., with multiple gaming units 20).

The gaming unit 20 may include one or more audio speakers 62, a coin payout tray 64, an input control panel 66, and a display unit 70. Where the gaming unit 20 is designed to facilitate play of a video casino game, such as video poker or video slots, the display unit 70 may be a color video display unit that displays images relating to the particular game or games. Where the gaming unit 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
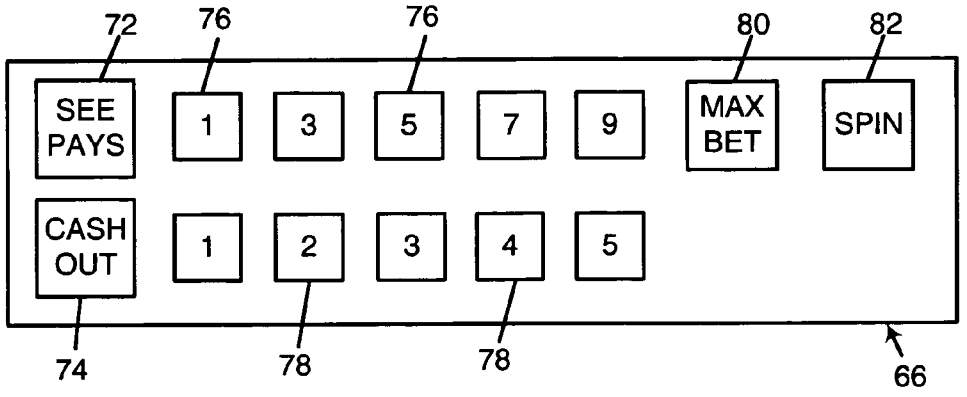
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, if the display unit 70 is provided in the form of a video display unit, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the display unit 70 is provided as a video display unit, the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
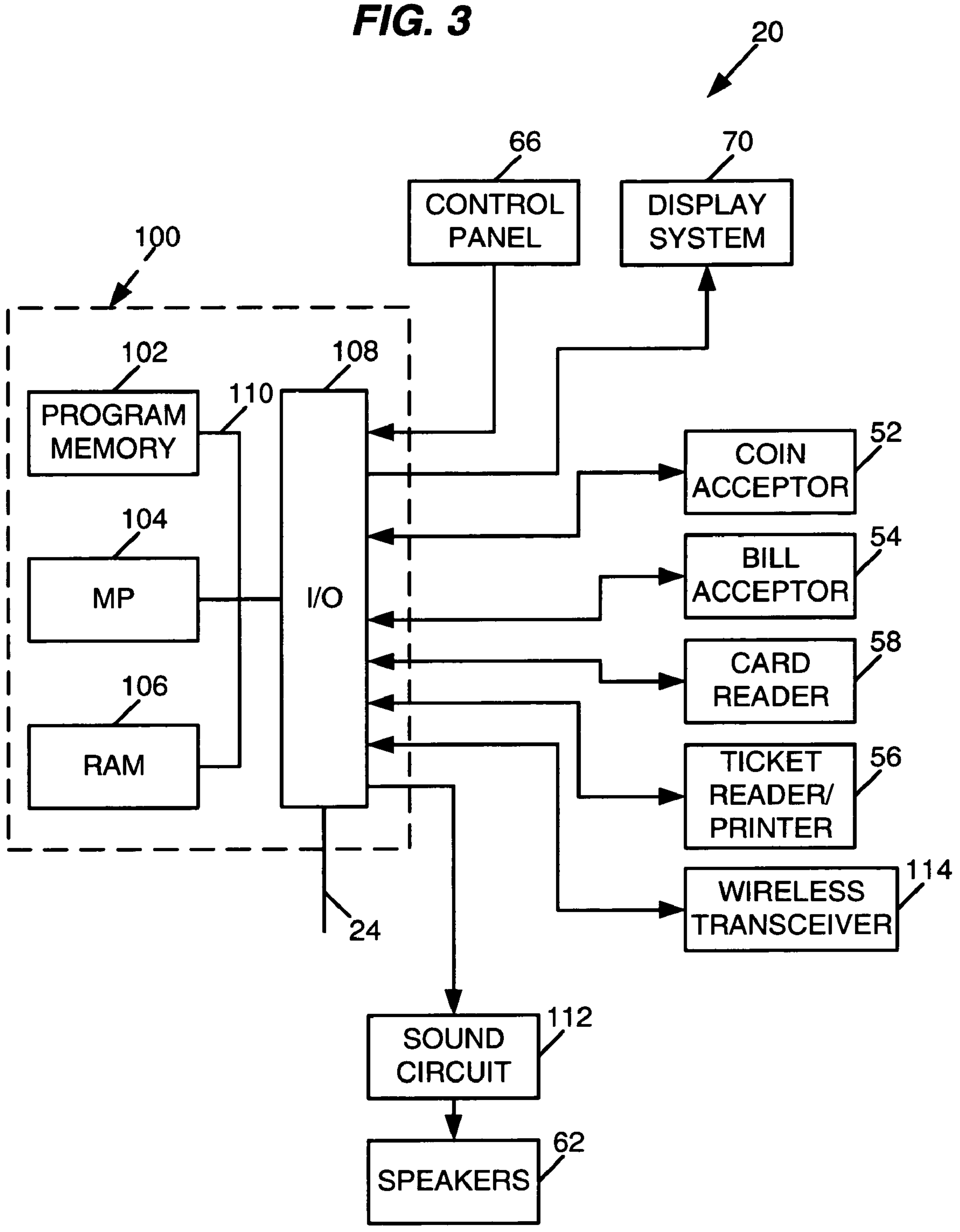
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108. A wireless transceiver 114 may also be coupled to the I/O circuit 108 for wireless communication, such as those described above, with the wireless communication device 46.

As shown in FIG. 3, the components 52, 54, 56, 58, 66, 112, 114 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Wireless Communicator Electronics

Figure 4:
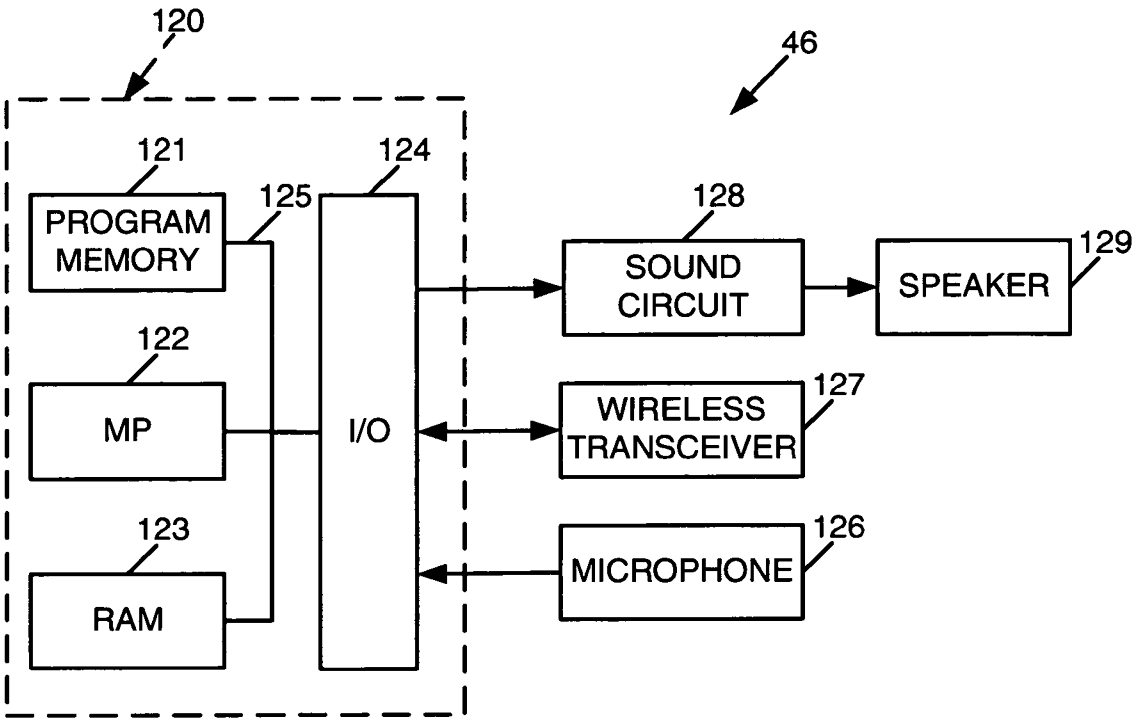
FIG. 4 is a block diagram of the electrical components of the wireless communication device shown schematically in FIG. 1.

FIG. 4 is a block diagram of a number of components that may be incorporated in the wireless communication device 46. Referring to FIG. 4, wireless communication device 46 may include a wireless controller 120 that may comprise a program memory 121, a microcontroller or microprocessor (MP) 122, a random access memory (RAM) 123 and an input/output (I/O) circuit 124, all of which may be interconnected via an address/data bus 125. It should be appreciated that although only one microprocessor 122 is shown, the wireless controller 120 may include multiple microprocessors 122. Similarly, the memory of the wireless controller 120 may include multiple RAMs 123 and multiple program memories 121. Although the I/O circuit 124 is shown as a single block, it should be appreciated that the I/O circuit 124 may include a number of different types of I/O circuits. The RAMs 123 end program memories 121 may be implemented as semiconductor memories, magnetically readable memories, and/or optically readable memories, for example.

Although the program memory 121 is shown in FIG. 4 as a read only memory (ROM) 121, the program memory of the wireless controller 120 may be a read/write or alterable memory, such as a hard disk. In the event a hard disk is used as a program memory, the address/data bus 125 shown schematically in FIG. 4 may comprise multiple address/data busses, which may be of different types, and there may be an I/O circuit disposed between the address/data busses.

FIG. 4 illustrates that the wireless communication device 46 may further include a microphone 126, a wireless transceiver 127 and a sound circuit 128, each of which may be operatively coupled to the I/O circuit 124 by either a unidirectional or bidirectional, single line or multiple line data link, which may depend on the design of the component that is used. In addition, the wireless communication device 46 may include a speaker 129 which may be operatively coupled to the sound circuit 128, that may comprise a voice- and sound-synthesis circuit or that may comprise a driver circuit. The microphone 126 may be capable of receiving sounds, including voice commands from the player, and converting those sounds into data signals to be interpreted by the controller 120.

The wireless transceiver 127 may be capable of sending and receiving data via a wireless communication with the gaming unit 20 via an antenna. The antenna may be a directional antenna having limited power and range to direct the wireless communication towards a particular receiver, such as the gaming unit 20, and avoid interference and communications with other wireless receivers, such as other gaming units 20. Alternatively, or in addition, the antenna may be an omni-directional antenna having greater power and range to communicate with multiple wireless receivers, such as multiple gaming units 20, network computers 22, kiosks, wireless nodes or other wireless access points. In one example, the wireless communication device 46 may switch between a high power, high range omni-directional mode of operation to a limited power, limited range directional mode of operation, and vice versa, which may depend on whether the wireless communication device 46 is engaging in broadcast communications or engaging in a communication session with a particular wireless access point, as disclosed further below. The wireless transceiver 127 may be capable of sending and receiving wireless data signals over a wide spectrum of frequencies, including those frequencies utilized by the wireless transceiver 114 of the gaming unit 20. The wireless transceiver 127 of the wireless communication device 46 may further be capable of communicating with additional wireless transceivers positioned throughout a casino which may be found in various devices including, but not limited to, network computers 22, kiosks, wireless nodes or other wireless access points.

As shown in FIG. 4, the components 126, 127, 128 may be connected to the I/O circuit 124 by a respective direct line or conductor. Different connection schemes could be used. For example, one or more of the component shown in FIG. 4 may be connected to the I/O circuit 124 via a common bus or other data link that is shared by a number of components. Furthermore, some of the components may be directly connected to the microprocessor 122 without passing thorough the I/O circuit 124. One or more buttons (not shown) may likewise be operatively coupled to the I/O circuit 124. The buttons may be used for various functions, including turning the wireless communication device 46 on or off, initiating a silence mode to no longer receive wireless communications, adjust volume, etc. One or more light emitting displays (LEDs) (not shown) or other visual indicators may also be operatively coupled to the I/O circuit 124. The LEDs may be utilized to provides visual indication of battery life, mode of operation (e.g., broadcast, silence, etc.), assistance request, volume, power, etc.

Figure 4A:
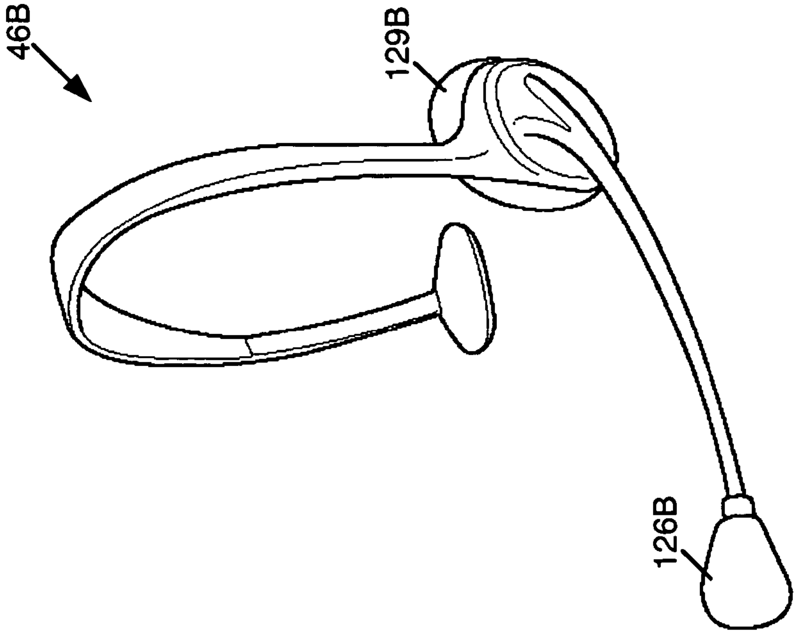
FIG. 4A is a perspective view an embodiment the wireless communication device shown schematically in FIG. 1.
Figure 4A:
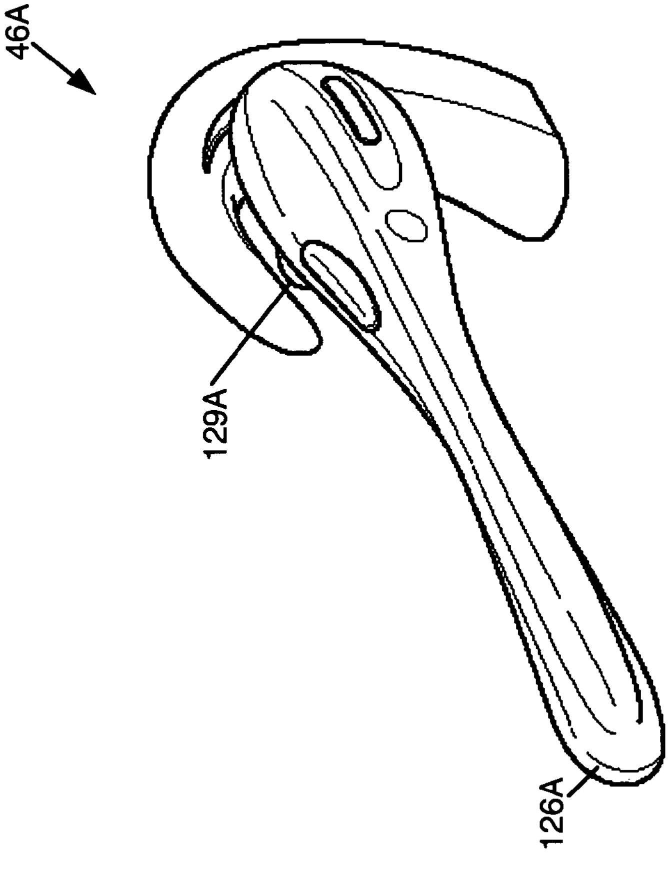

FIGS. 4A and 4B are perspective views of two possible embodiments of one or more of the wireless communication devices 46. Although the following description addresses the design of the wireless communication device 46, it should be understood that the design of one or more of the wireless communication devices 46 may be different than the design of other wireless communication devices. Each wireless communication device 46 may be any type of wireless communication device and may have various different structures and methods of operation. For exemplary purposes, various designs of the wireless communication devices 46 are described below, but it should be understood that numerous other designs may be utilized. For example, additional designs not shown may include a lanyard device that may be worn around a player's neck, such as a pendant on a rope or chain. Alternatively, the wireless communication device 46 may be designed to be worn on the player's wrist, or may be removeably affixed to the player's clothing, such as a broach or lapel pin.

Referring to FIG. 4A, one example of the wireless communication device 46A may include a microphone 126A and a speaker 129A. The wireless communication device 46B may further include a housing which may be used to house the wireless controller 120, the wireless transceiver 127 and the sound circuit 128. The speaker 129A may be provided as an earpiece that may be positioned over or within the player's ear. The wireless communication device 46A may be provided with such weight and size as to be easily worn by the player by positioning the wireless communication device 46A on and/or partially within the player's ear, such that the microphone 126A is positioned towards the player's mouth to receive voice commands and the speaker 129A is positioned over or in the player's ear to receive sounds.

Referring to FIG. 4B, a wireless communication device 46B may include a microphone 126B and a speaker 129B. The wireless communication device 46B may further include a housing which may be used to house the wireless controller 120, the wireless transceiver 127 and the sound circuit 128. As in the example above, the speaker 129B may be positioned over or within the player's ear, with the microphone 126B positioned towards the player's mouth to receive voice commands. As shown in FIG. 4B, the wireless communication device 46B may be designed so as to fit over the player's head, which may be an alternative to fitting the wireless communication device 46B over and/or partially within the player's ear as in FIG. 4B.

Overall Operation of Wireless Communications

One manner in which one or more of the gaming units 20 (and one or more of the gaming units 30), may communicate with the wireless communication device 46 is described below in connection with a number of flowcharts which represent a number of portions or routines of one or more computer programs, which may be stored in one or more of the memories of the controller 100 or the wireless controller 120. The computer program portions may be written in any high level language such as C, C++, C#, Java or the like or any lower level assembly or machine language. While storing the computer program portions therein, various portions of the memories 102, 106, 121, 123 are physically and/or structurally configured in accordance with computer program instructions.

Figure 5:
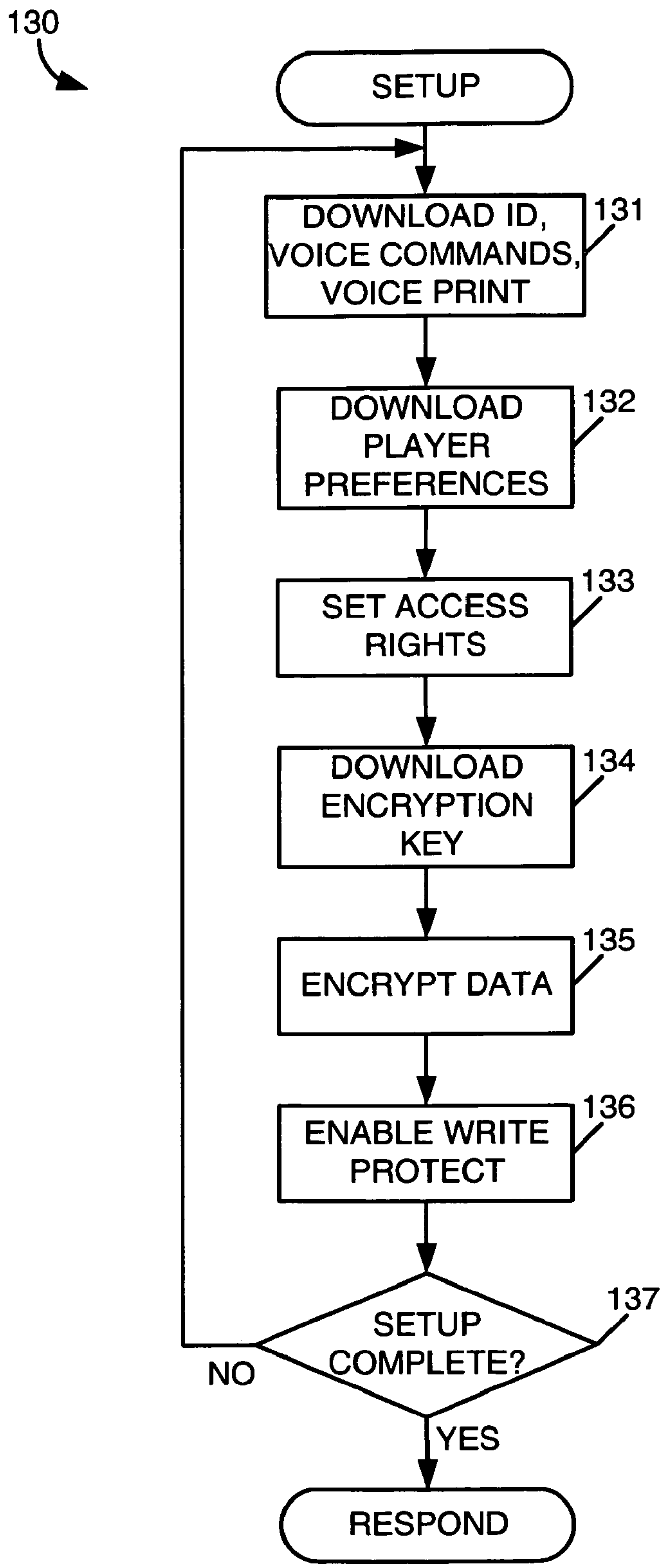
FIG. 5 is a flowchart of an embodiment of a setup routine that may be performed by the wireless communication device.

FIG. 5 is a flowchart of a setup routine 130 that may be stored in the memory of the wireless controller 120 of the wireless communication device 46. Referring to FIG. 5, the setup routine 130 may begin operation at block 131 during which a player identification, player voice commands, and the player's voiceprint may be downloaded to one or more of the memories of the wireless controller 120. The player identification, the player voice commands, and the player voiceprint may have been previously entered by the player and stored in the network gaming computer 22, or another central registration computer, during a player registration process. Alternatively, the wireless controller 120 may be utilized to initially enter the player's identification, voice commands, the player's voiceprint, etc., such that at block 131 such information is entered by the player using the wireless communication device 46 rather than downloading the information. Although a player's voiceprint is disclosed, additional forms of biometric data may also be implemented including, but not limited to, handprints, fingerprints, hand geometry, eye or retinal recognition, facial recognition, olfactory recognition, thermograms, keyboard/input metrics and dynamics (e.g., typing patterns, speed, etc.) and signature validation, for example. Such biometric data may be read using corresponding image scanners, touchpad sensors, video cameras, odor detectors, heat sensors and analysis software to isolate particular characteristics uniquely associated with the player. The biometric data may be stored and accessed in a variety of formats, including, but not limited to, image scans, photographic data, odor analysis data, thermography scans or pattern analysis data for comparison to biometric data read as part of an authentication process. Any combination of these forms of authentication may be used by authentication processes initiated by the wireless communication device 46, the gaming unit 20 or another device requiring authentication.

In providing the information, the player may speak voice commands into a microphone which are recorded and associated with various functions to be performed by the gaming units 20, the network computer 22, the wireless communication device 46, etc. For example, the player may record a voice command to bet one credit wherein the network computer 22 records the player saying "bet one credit." In one example, the voice commands may relate to particular gaming functions, some of which are represented by the various buttons disclosed throughout this application, including, but not limited to, "see pays," "cash out," "max bet," "spin," "deal," "draw," "stay," "hit," "selected ticket," "select number," "play," "selected card," etc. Additional voice commands that may be recorded may relate to receiving financial information, placing drink and food orders, terminating wireless communications, etc. Each of the voice commands may cause the wireless communication device 46, the gaming unit 20 and/or the network computer 22 to execute a particular function in response to the voice command.

Voice recognition software may be utilized by the wireless controller 120 to correlate each of these spoken voice commands with the particular function. For example, the player may be prompted to say "bet one credit" which is associated with entering a wager of one credit with a gaming unit 20, or to say "see pays" which is associated with a function such as displaying a payout table on the display unit 70 of the gaming unit 20. The player may be then prompted to record another voice command which is associated with another function, examples of which are mentioned above and below in connection with various routines that may be performed by the gaming unit 20. The prompt may include a voice prompt which may be generated by the wireless communication device 46 through the speaker 129 to prompt the player to speak the voice commands into the microphone 126. By directly correlating particular phrases with particular commands, the wireless controller 120 may take into account speech behaviors, such as accents, speech patterns, etc., that vary from person to person. Further, speech that has been affected by additional circumstances, such as illness, may also be taken into account.

On the other hand, the voice recognition software may be pre-programmed to recognize particular words or phrases, without a player correlating each command with a phrase, as disclosed above. In some examples, voice recognition software may identify key aspects of speech that are generally common among most players. Although pre-programmed voice recognition software may take into account variances in accents, speech patterns, or other speech behaviors, the player may still be prompted to calibrate the voice recognition software by speaking particular words or phrases. The wireless controller 120 may respond by audibly repeating the calibration word or phrase, and the player may indicate a correct response or an incorrect response. The word or phrase may be repeated several time, and a statistical average having acceptable minima and maxima calculated to determine a range of recognition by the voice recognition software. In one example, the player may type in the correct word or phrase which the wireless controller 120 may associate with the spoken word or phrase. The wireless controller 120 may thereby be trained to take into account each player's speech behaviors, and may further correct for speech that has been affected by other circumstances, such as illness.

As mentioned above, the player's voiceprint may be downloaded to the wireless communication device 46. The player's voiceprint may also be stored in a memory of the network computer 22. In one example, the player's voiceprint may be the player identification and may be recorded as biometric data. The player's voiceprint may be a simple recording of the player's voice or may be the result of analysis of the player's speech patterns which are uniquely associated with the player. Further, a statistical average of a player's voice pattern with acceptable minima and maxima may be performed to determine a range of recognition by the voice recognition software. The speech patterns may generally exist in a player's speech independent of variations in how the player speaks. For example, a voice print may be the same for a player speaking in a normal voice as it is for the same player whose speech is affected by illness, although generally unique to that player as compared to other players. In addition, the player's voiceprint may also relate to the player's language. For example, a player may specify during registration that the player's primary language is Spanish. A wireless communication device 46 may be automatically adjusted, such as by downloading an appropriate voice recognition routine, to accommodate the player's language.

Once the player's identification, voice commands and voiceprint have been downloaded (or entered) at block 131, the player's preferences may be downloaded to the wireless communication device 46 at block 132. Alternatively, a voice prompt may be generated by the wireless communication device 46 through the speaker 129 to prompt the player to speak his or her preferences into the microphone 126. The player preferences may relate to a variety of preferences, including, but not limited to, games, game themes, wager amounts, drinks, food, etc. The player preferences may be stored in one or more of the memories of the wireless controller 120.

At block 133, the routine 130 may further establish access rights related to player's access to cash, accounts, promotions, etc., some or all of which may be based on the player identification and the player preferences provided above. For example, access rights may be granted to promotions directed towards new players if the player's identification relates to a new player account, whereas access to promotions directed to returning players may be restricted from the new players. Promotions may relate to free wagers, specials on drinks and food, bonus games and the occurrence thereof, etc. In some cases, the player may have established an account from which to electronically deposit or withdraw money as needed. Therefore, at block 133, access rights may be granted to this account based on the prior identification and/or voiceprint. Access rights to particular services, gaming units 20, game, etc. may also be granted on the basis of player status, such as for returning or preferred customers. For example, the wireless communication device 46 may include a "privileged" mode of operation for a returning or preferred customer, whereby the player may be granted access to services not otherwise available to regular players, such as additional gaming capabilities (e.g., sports betting), or access to concierge services (e.g., tickets, restaurant reservations, etc.), for example. Access rights to particular areas and locations, such as a hotel room or private gaming areas, may also be granted whereby the wireless communication device 46 may be -utilized to provide a player access to otherwise restricted areas and locations.

At block 134, the wireless communication device 46 may be registered with an authentication server and undergo an encryption key exchange with the authentication server. The encryption keys may include public/private encryption key pairs for asymmetric encryption of data transmitted to and from the wireless communication device 46. At block 135, the routine 130 may encrypt the data downloaded at blocks 131 and 132. Additionally, the routine 130 may enable a write protection at block 136 to prevent the stored information from being erased or altered unless authorized to do so. At block 137 the routine 130 may verify if the set up operation has been completed. If not, the routine 130 may loop through various set up options to identify and correct those set up options that have not been completed. Once set up is complete, as determined at block 137, the set up routine may terminate and pass control to another routine to allow the wireless communication device 46 to search for and respond to wireless transmissions being broadcast throughout the casino.

Figure 5A:
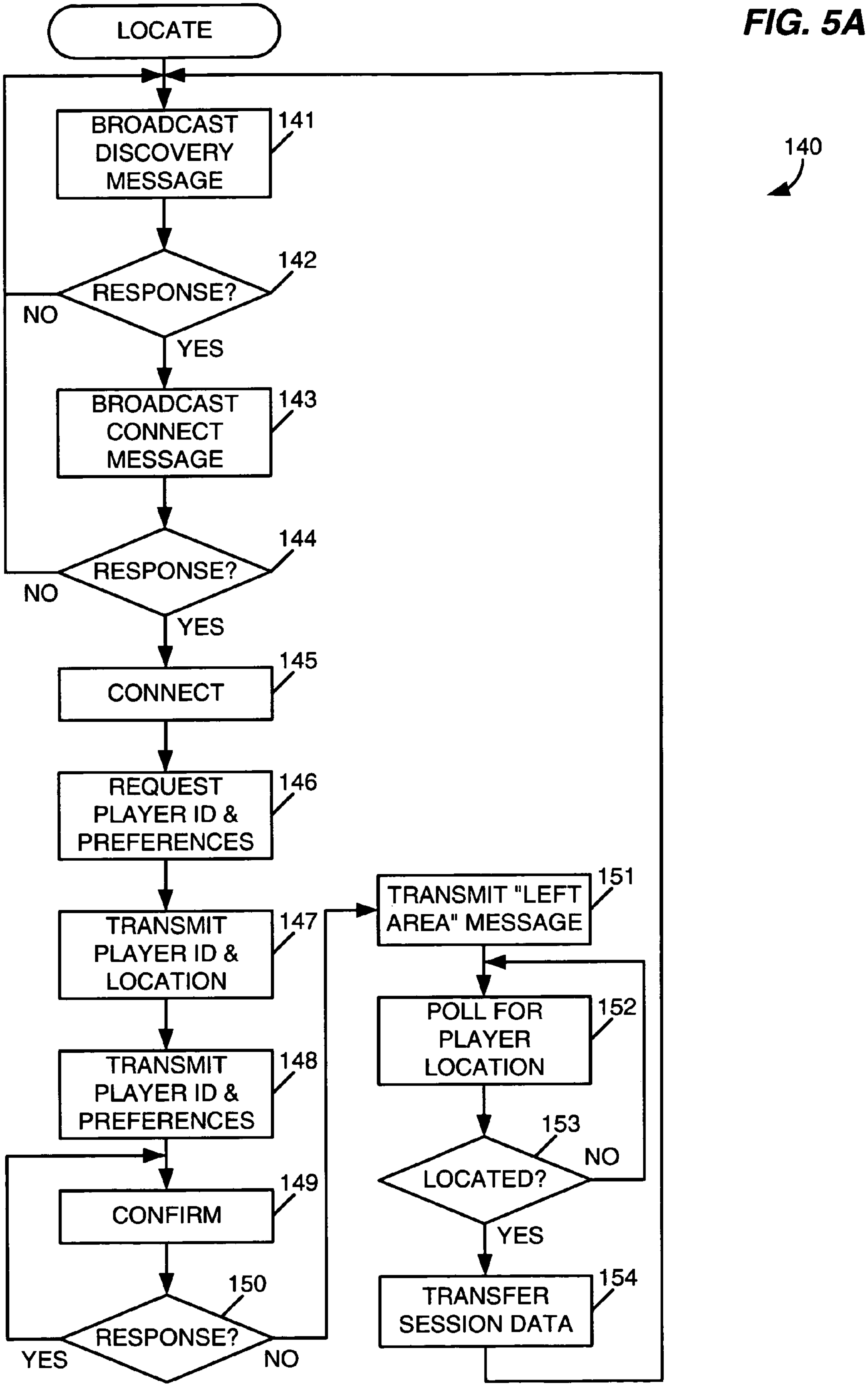
FIG. 5A is a flowchart of an embodiment of a locating routine that may be performed by the gaming unit.

FIG. 5A is a flowchart of a locating routine 140 that may be stored in the memory of a controller of an access point within the casino. The casino may be provided with numerous access points throughout the casino to locate and identify the player via the wireless communication device 46. As used herein, an access point may refer to any device having a wireless transceiver capable of receiving and/or broadcasting wireless transmissions to or from the wireless communication device 46. For example, wireless transceivers may be positioned throughout the casino and operatively coupled to the network computer 22. Alternatively, or in addition, each of the gaming units 20 may operate as an access point via the wireless transceiver 114. In the example described with reference to FIG. 5A, the locating routine 140 will be described as a routine stored in the memory of the controller 100 of a gaming unit 20, wherein the gaming unit 20 communicates with the wireless communication device 46 as an access point using the wireless transceiver 114. Although one access point may be capable of locating and identifying the player via the wireless communication device 46, multiple access points may be coordinated to utilize the locating routine 140 to triangulate the position of the player.

Referring to FIG. 5A, the locating routine 140 may begin operation at block 141 during which a discovery message is broadcast via the wireless transceiver 114. The discovery message may be broadcast to any of the wireless communication devices 46 with the broadcast range of the wireless transceiver 114. The broadcast message may prompt the wireless communication device 46 to respond. If such a response is detected at block 142, the routine 140 may cause a connection message to be broadcast at block 143. Otherwise, the routine 140 may continue to periodically broadcast a discovery message until the wireless transceiver 114 receives a response from the wireless communication device 46. At block 144, the routine 140 may verify the connection with the wireless communication device 46 by prompting the wireless communication device 46 for a response to the connection message broadcast at block 143. If no response is provided, the routine 140 may return to broadcasting the discovery message at block 141. If the wireless communication device 46 responds, as determined at block 144, a connection may be established between the wireless transceiver 114 and the wireless communication device 46 at block 145.

Having established a connection, the routine 140 may cause the gaming unit 20 to request the player identification from the wireless communication device 46 at block 146. Player preferences may also be requested at block 146. Once the player identification and player preferences have been received, the player identification and the location of the gaming unit 20, which may be stored in a memory of the controller 100, may be transmitted to the network computer 22. The network computer 22 may thereby be notified that the player is within the vicinity of the access point. The vicinity may refer to the broadcast range of the wireless communication device 46. Additionally, the player identification and the player preferences may be transmitted at block 148 to additional gaming units 20 in the vicinity of the player. This may enable the various gaming units 20 within the vicinity of the player to establish communication with the wireless communication device 46 and broadcast audio messages and display images customized for the player according to the player identification and preferences such as promotions, music, attraction sequences, etc., some of which may be subject to the access rights determined during the set up routine 130. Additional devices other than gaming units 20 (e.g., television monitors, kiosks, etc.) may likewise be modified to broadcast audio messages and display images customized for the player. In addition, the access point may use the player identification to allow the player access to his/her hotel room or areas of the casino restricted to particular players, order food or drinks, balance transfers, each of which may be in response to a voice command from the player.

At block 149, the routine 140 may confirm whether or not the player remains in the vicinity of the access point by broadcasting a confirmation message at block 149 requesting the wireless communication device 46 to verify its presence. The confirmation message may be broadcast at block 149 continuously or at predetermined intervals of time. If provided with a response, as determined at block 150, the routine 140 may continue to periodically confirm the presence of the wireless communication device 46. If the wireless communication device 46 does not provide a response, as determined at block 150, a message indicating that the player has left the vicinity of the access point may be transmitted to the network computer 22 and/or the gaming unit(s) 20 within the vicinity (e.g., those contacted at block 148). The routine 140 may further cause the access point to poll additional access points for the location of the player at block 152. The access point may continue polling additional access points for the location of the player until the player is located as determined at block 153. Once located, the access point may transfer, or hand off, data regarding the player (e.g., the player's previous locations, games played, duration at a particular location, movement patterns, etc.) to the new access point that has located the player. By continually locating the player, the player's movements may be tracked and areas around the player may continually be tailored to the player as the player moves throughout an establishment. The tracking of multiple players may be used to provide traffic analysis within the establishment.

In addition to generally locating a player using the locating routine 140, the locating routine 140 may be used for emergency purposes. For example, during the setup routine 130 the wireless communication device 46 may be programmed by the player (e.g., as part of the player preferences or voice commands) to transmit a distress call or request for assistance in the event of an emergency. The wireless communication device 46 may also be programmed according to specific emergencies, such as when the player may have a medical condition, which may automatically alert appropriate medical personnel when the distress call is initiated. A default emergency response may alert security personnel. The distress call may be triggered by a variety of events, including a voice command such as "help," or activation of a button, for example. Although the distress call may not be in response to a broadcast message, any access point within the range of the wireless communication device 46, or the last access point to have located the wireless communication device 46, may automatically transmit location information along with an emergency request directly to the appropriate personnel or to a central computer, such as the network computer 22, which may in turn contact the appropriate personnel. Although the distress call may specify the nature of the emergency (e.g., medical, security, etc.), the central computer may determine the nature of the emergency based upon the programming of the wireless communication device 46 during the setup routine 130 and alert the appropriate personnel accordingly with information regarding the emergency and the last known location of the player.

While the location information provided by the access point may relate to a generalize location indicating that the player is within the vicinity of the access point, the responding personnel may also be provided with a wireless communication device 46 to specifically pinpoint the player's location. As the responding personnel proceed to the last known location of the player, the wireless communication device 46 of the player may detect the presence of the wireless communication device 46 of the responding personnel, and begin to initiate an operational mode to attract the responding personnel to the player's specific location. The attraction mode may include emission of a sound or light, or a transmitted signal indicating proximity, for example. A proximity or location signal may be based on global positioning or may include a simple transmission transmitted to one or more access points, including the wireless communication device 46 of the responding personnel which may be used to triangulate the source of the signal (e.g., by comparing time of transmission to time of receipt). The wireless communication device 46 of the responding personnel may thereby act as an access point and execute the locating routine 140 to locate and communicate with the wireless communication device 46 of the player. In another example, the wireless communication device 46 of the player may act as an access point and execute the locating routine 140 to locate and communicate with the wireless communication device 46 of the responding personnel.

Figure 5B:
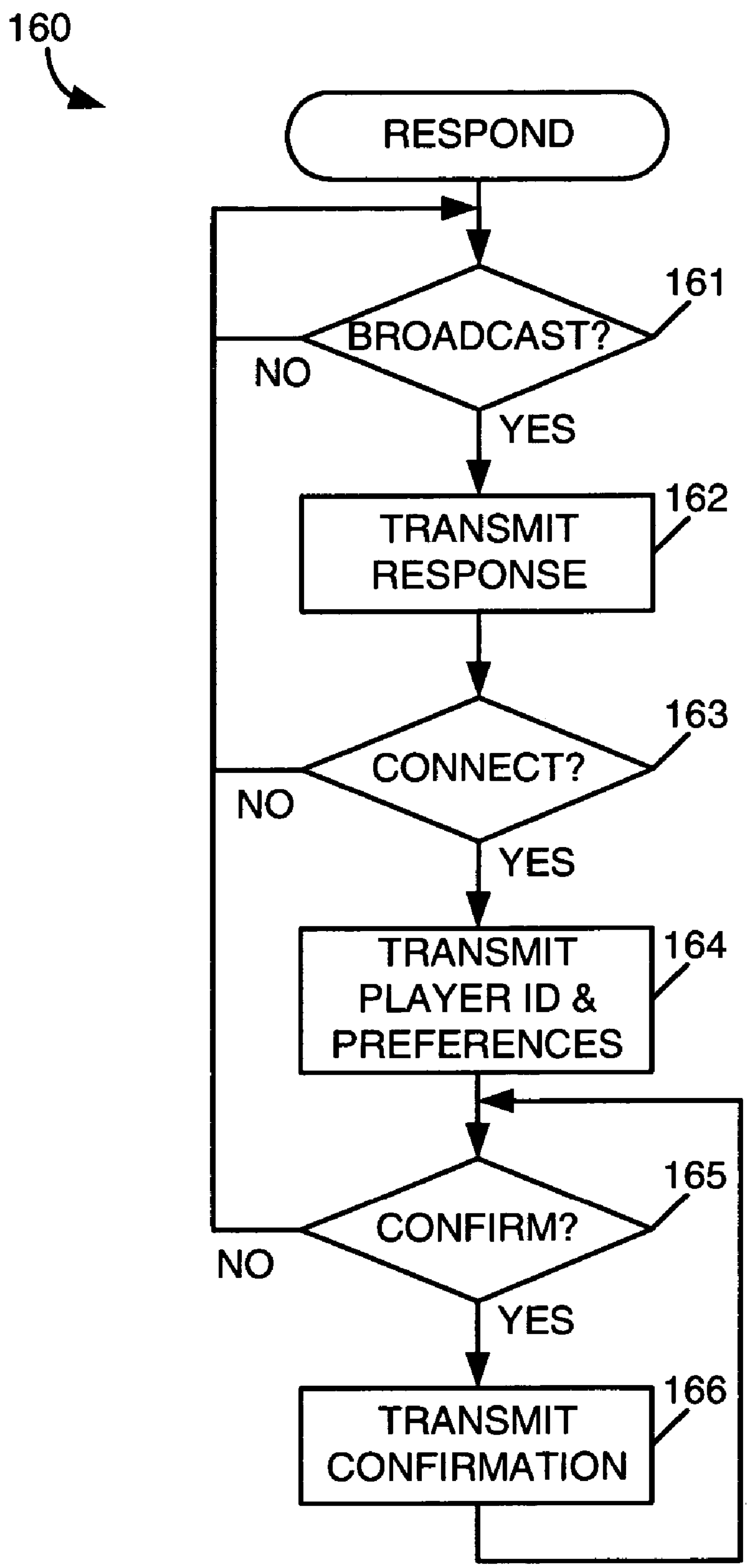
FIG. 5B is a flowchart of a response routine that may be performed by the wireless communication device.

FIG. 5B is a flowchart of a response routine 160 that may be stored in the memory of the wireless controller 120 of the wireless communication device 46 for communication with the access point described above. Referring to FIG. 5B, the response routine 160 may begin operation at block 161 during which the wireless communication device 46 searches for any discovery messages being broadcast by an access point. If the wireless communication device detects a discovery message being broadcast, as determined at block 161, the wireless communication device 46 may transmit a response to the access point at block 162 via the wireless transceiver 127. The routine 160 may then search for a connection message being broadcast by the access point at block 163. If the wireless communication device 46 does not detect a connection message being broadcast by the access point, the routine 160 may return to searching for discovery messages being broadcast at block 161. Otherwise, the routine 160 may cause the wireless communication device 46 to transmit the player identification and player preferences to the access points at block 164.

As mentioned above, the access point may transmit a confirmation message to determine if the wireless communication device 46 (and hence the player) is still in the vicinity. The wireless communication device 46 may therefore periodically detect whether or not a confirmation message has been transmitted from the access point, such confirmation message being detected at block 165. If the wireless communication device 46 receives the confirmation request, as determined at block 165, the wireless communication device 46 may transmit a confirmation message to the access point to verify that the player is still within the vicinity. Otherwise, the routine 160 may pass control to block 161 to search for a new discovery message being broadcast.

Figure 5C:
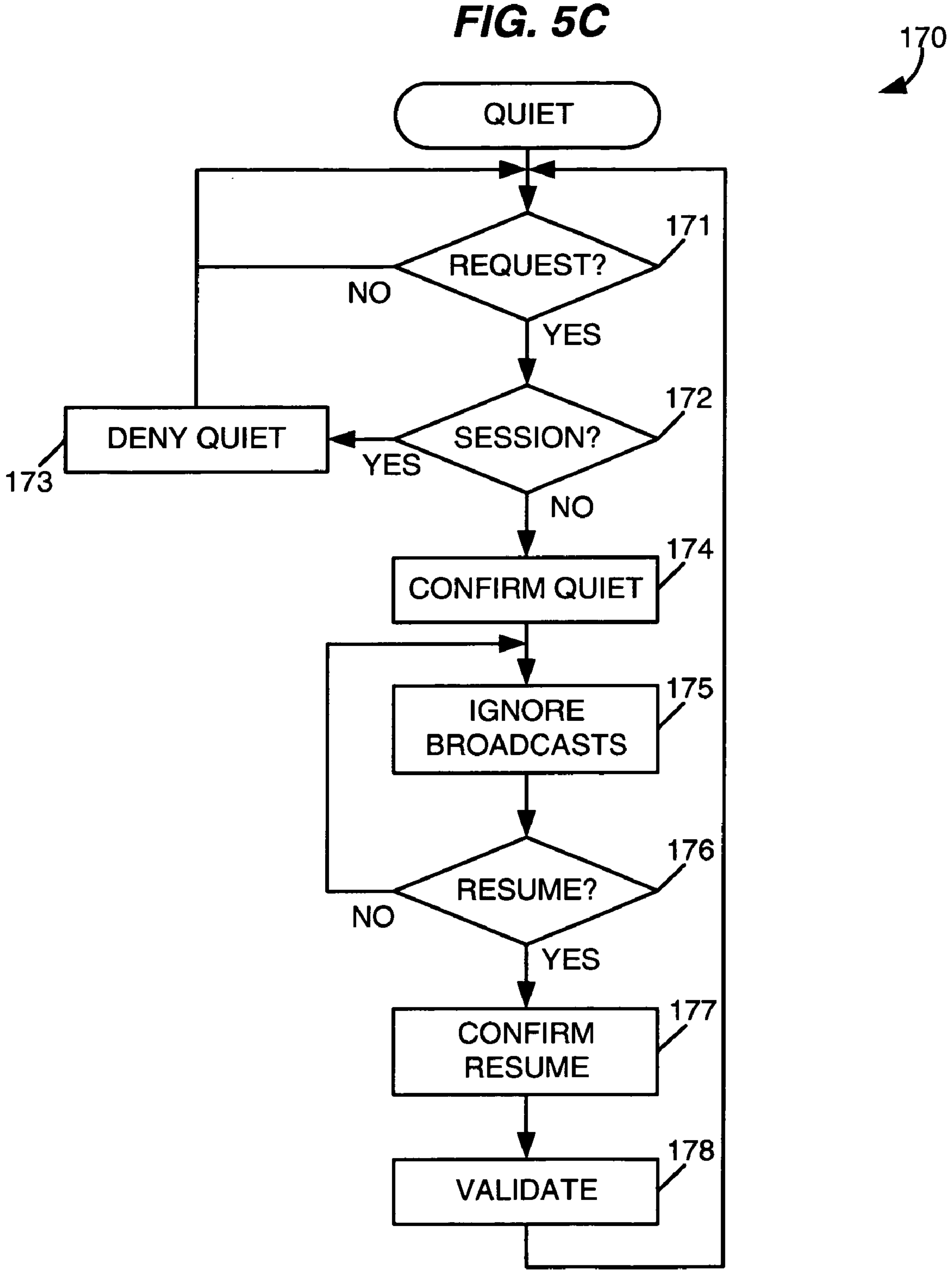
FIG. 5C is a flowchart of a silence routine that may be performed by the wireless communication device.

FIG. 5C is a flowchart of a silence routine 170 that may be stored in the memory of the wireless controller 120 of the wireless communication device 46. As mentioned above, the gaming units 20, or other devices with wireless transceivers, may broadcast various audio messages to the player via the wireless communication device 46, including, but not limited to, promotional offers, music, attraction sequences, etc. When player no longer wishes to receive such broadcast messages, the player may initiate the silence routine 170 described below.

Referring to FIG. 5C, the silence routine 170 may begin operation at block 171 during which the wireless communication device 46 may determine whether or the player has requested not to receive any further broadcast messages. If the player has made such a request, which may be expressed as a voice command or by activating a switch (e.g., a button) on the wireless communication device 46, the routine 170 may determine whether or not the player is currently engaged in bidirectional communications, such as a gaming session, with a gaming unit 20 at block 172. For example, a gaming session generally does not include broadcast messages, but rather direct communications between the gaming unit 20 and the wireless communication device 46.

If the player is engaged in a bidirectional communication, the routine 170 may deny the player's request to continue with the silence routine 170 at block 173. The routine 170 may inform the player of such denial at block 173 via an appropriate audio message via the speaker 129. However, if the player is not engaged in a bidirectional communication with a gaming unit 20, the silence routine 170 may confirm that the player wishes to initiate the silence mode at block 174 by playing an appropriate audio message requesting confirmation via the speaker 129. The player may express confirmation via a voice command or the switch (e.g., depressing the button).

At block 175, the silence routine 170 may cause the wireless communication device 46 to ignore all broadcasts or otherwise no longer receive the various wireless communications, which may be accomplished by disabling the wireless transceiver 127. Alternatively, the wireless communication device 46 may continue to receive wireless communications, but deactivate or otherwise disable the sound circuit 128 and/or the speaker 129 such that audio messages are no longer played through the speaker 129. However, other broadcast messages may continue, including those relating to the locating routine 140. Also at block 175, the silence routine 170 may cause the wireless communication device 46 to engage in a power saving mode, which may include minimizing use of components that are not used during the silence mode.

Periodically, the silence routine 170 may determine whether or not the player wishes to resume receiving wireless communications at block 176, such wish being expressed via a voice command or activating the above-mentioned switch. The wireless communication device 46 may continue to ignore all broadcasts until the player signifies otherwise as determined at block 176. The silence routine 170 may confirm that the player wishes to resume receiving broadcasts at block 177 by requesting confirmation via the speaker 129, wherein the player may confirm resumption by voice command or activating the switch (e.g., depressing the button). Having confirmed the resumption of broadcast, the silence routine 170 may reactivate, or otherwise enable the wireless transceiver 127, the sound circuit 128 and/or the speaker 129.

While the above has described various methods and uses of the wireless communication device 46 by a player in gaming operations, it should be understood that additional persons, such as casino personnel, maintenance personnel or supervisory personnel, may use the wireless communication device 46 to obtain authorized access to the gaming unit 20. For example, as disclosed above, security personnel, medical personnel or other emergency personnel may use the wireless communication device 46 to locate a player requiring emergency services. The emergency personnel may further use the wireless communication device 46 to administer aid to the player by requesting supplies, services, additional personnel, etc. using the wireless communication device 46.

In another example, authorized personnel (e.g., casino personnel, maintenance personnel, supervisory personnel, auditors, etc.) may utilize the wireless communication device 46 to access maintenance and service functions of a gaming unit 20, which are not otherwise available to a player. During the setup routine 130, the personnel identification, voiceprint and voice commands may be downloaded to the memory of the wireless controller 120 at block 131. Although the personnel may provide this information to the wireless controller 120 directly, this information may be provided from the network gaming computer 22 or other secure centralized personnel server for security purposes. As above, the voiceprint may be used for identification purposes. If desired, the personnel's preferences may be provided to the wireless communication device 46 at block 132.

At block 133, the routine 130 may establish the personnel's access rights based on the personnel's status (e.g., identification and/or work order), including, but not limited to, access to the maintenance and service functions of one or more of the gaming units 20. For instance, the personnel may be restricted only to particular gaming units 20 and/or particular functions based on the personnel's status (e.g., security clearance, a work order, etc.), and may be restricted from other services, including, but not limited to, access rights normally granted to a player. The wireless communication device 46 may then be registered with an authentication server, which may be the network computer 22 or a centralized personnel server, and undergo an exchange of encryption keys. Write protection may also be enabled at block 136 to prevent unauthorized access.

The personnel may then proceed to the appropriate gaming unit(s) 20, establish a communication session with a gaming unit 20 as disclosed above and further below. The personnel may thereby access the functions and services of the gaming unit 20 using a unique identification, such as a voice print. Additional commands may be provided by the personnel to the gaming unit 20 via voice command. Access to the gaming unit 20 and actions taken during such access may be recorded and/or transmitted by the wireless communication device 46, along with a timestamp of each occurrence, to track all authorized and unauthorized access and actions taken with respect to the gaming unit 20.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 6:
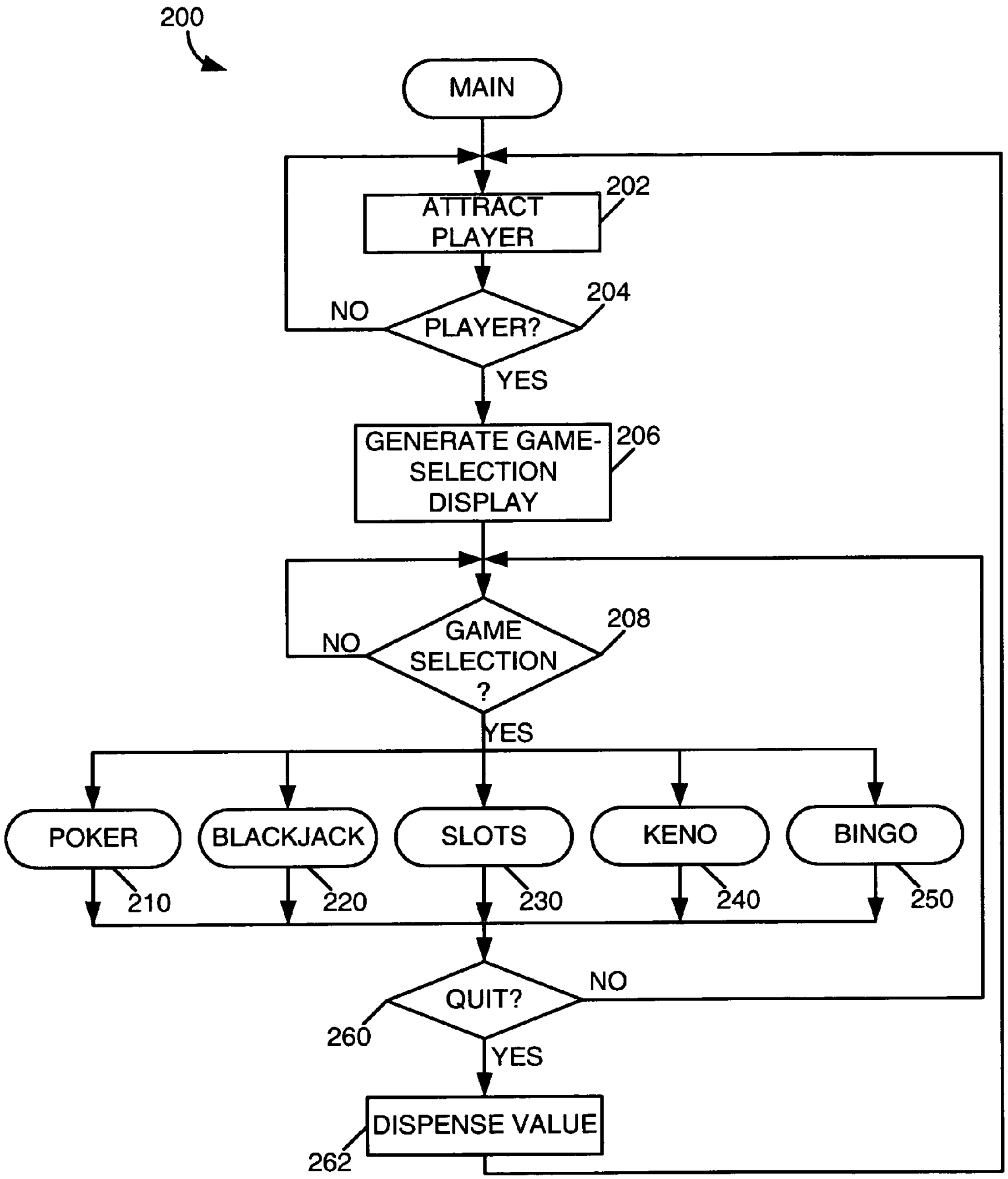
FIG. 6 is a flowchart of an embodiment of a main routine that may be performed during operation of one or more of the gaming units.

FIG. 6 is a flowchart of a main operating routine 200 that may be stored in the memory of the controller 100. Referring to FIG. 6, the main routine 200 may begin operation at block 202 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62 or broadcast via the wireless transceiver 114. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 (if provided as a video display unit) at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; the gaming unit 20 could receive a message, such as a voice command or discovery confirmation message, from the wireless communication device 46, etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 6, a different number of routines could be included to allow play of a different number of games. The gaming unit 20 may also be programmed to allow play of different games.

Figure 6A:
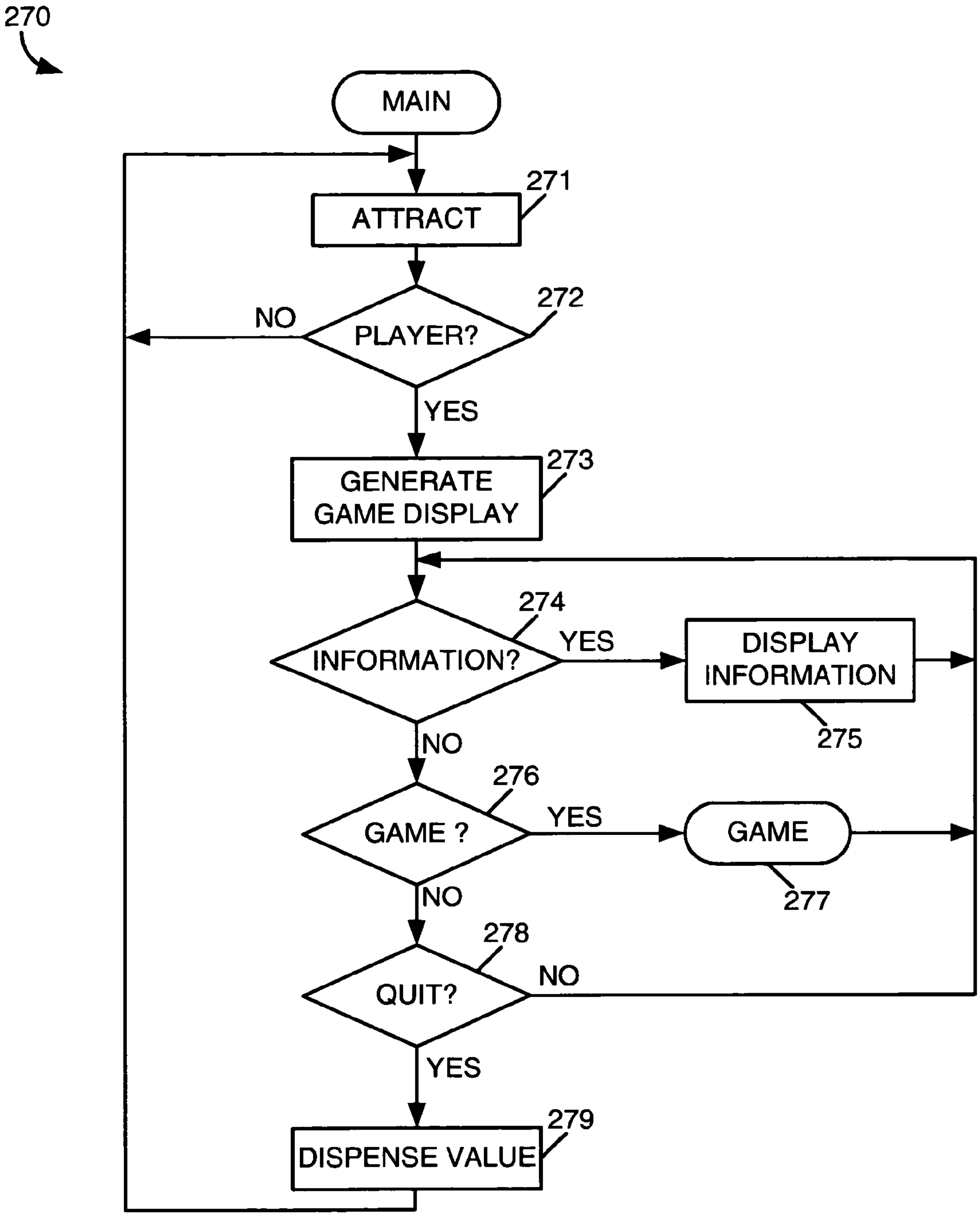
FIG. 6A is a flowchart of an alternative embodiment of a main routine that may be performed during operation of one or more of the gaming units.

FIG. 6A is a flowchart of an alternative main operating routine 270 that may be stored in the memory of the controller 100. The main routine 270 may be utilized for gaming units 20 that are designed to allow play of only a single game or single type of game. Referring to FIG. 6A, the main routine 270 may begin operation at block 271 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62.

During performance of the attraction sequence, if a potential player makes any input to the gaming unit 20 as determined at block 272, the attraction sequence may be terminated and a game display may be generated on the display unit 70 (if provided as a video display unit) at block 273. The game display generated at block 273 may include, for example, an image of the casino game that may be played on the gaming unit 20 and/or a visual message to prompt the player to deposit value into the gaming unit 20. At block 274, the gaming unit 20 may determine if the player requested information concerning the game, in which case the requested information may be displayed at block 275. Block 276 may be used to determine if the player requested initiation of a game, in which case a game routine 277 may be performed. The game routine 277 could be any one of the game routines disclosed herein, such as one of the five game routines 210, 220, 230, 240, 250, or another game routine.

After the routine 277 has been performed to allow the player to play the game, block 278 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 279 based on the outcome of the game(s) played by the player. The operation may then return to block 271. If the player did not wish to quit as determined at block 278, the operation may return to block 274.

Figure 6B:
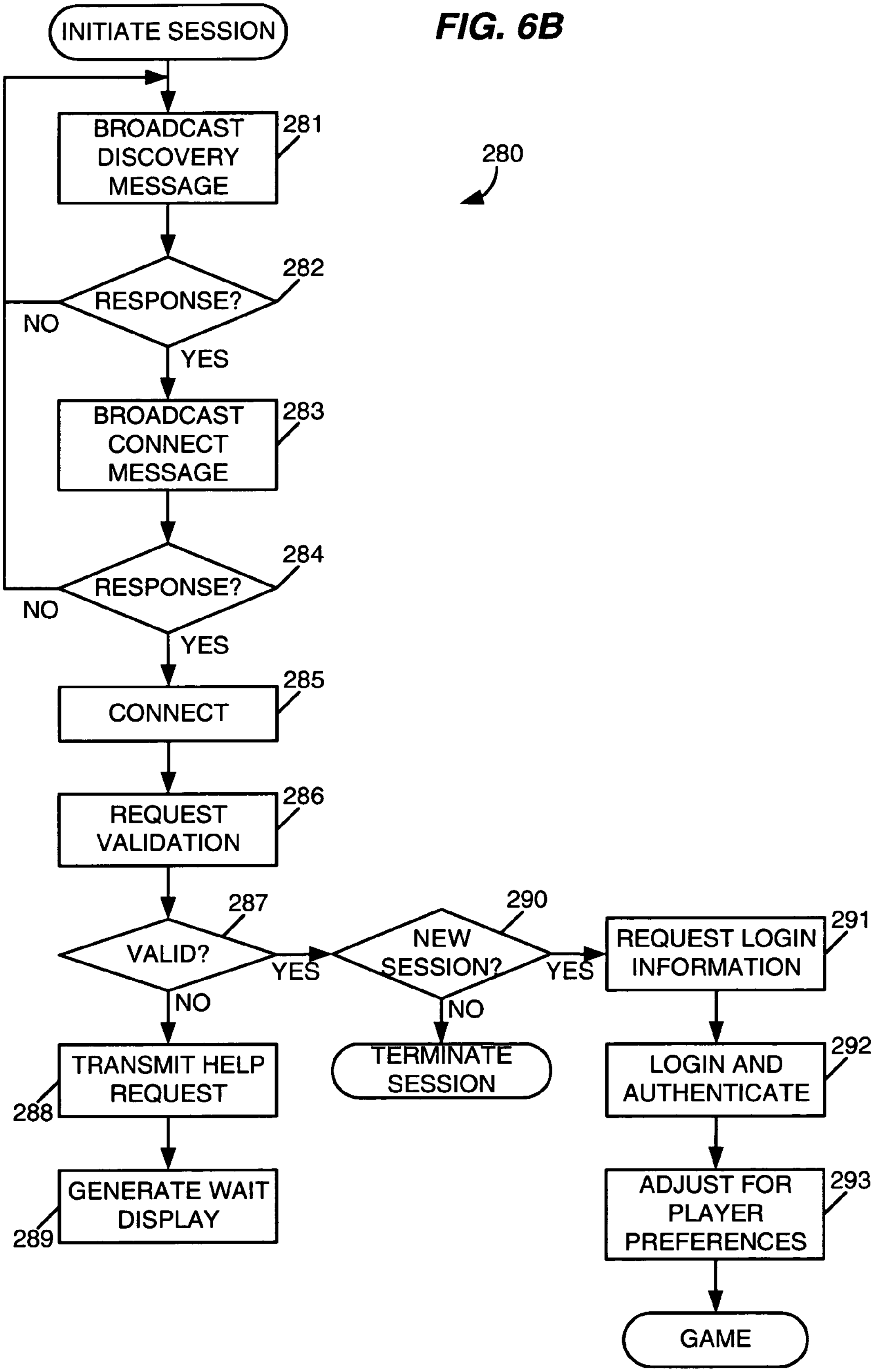
FIG. 6B is a flowchart of a communication session routine that may be performed during operation of one or more of the gaming units.

FIG. 6B is a flowchart of a communication session routine 280 that may be stored in the memory of the controller 100 of the gaming unit 20. The communication session routine 280 may be utilized by the gaming unit 20 to initiate a gaming session between the player and the gaming unit 20 by initiating a bidirectional communication between the wireless transceiver 114 of the gaming unit 20 and wireless transceiver 127 of the wireless communication device 46. Although described as a separate routine, it should be understood that the session routine 280 may be incorporated into either of the main routines 200, 270 shown in FIGS. 6 and 6A. In particular, the communication session routine 280 may be implemented as part of the attraction sequence at blocks 202, 271 and/or detection of the player input at blocks 204, 272. In another example, the communication session routine 280 may be initiated when a gaming unit 20 is informed that a player is within the vicinity of the gaming unit 20, as determined by the locating routine 140.

Referring to FIG. 6B, the communication session routine 280 may begin operation at block 281 during which the gaming unit 20 may broadcast a discovery message via the wireless transceiver 114. The discovery message may request that all wireless communication devices 46 within the vicinity of the gaming unit 20 respond to the discovery message. The vicinity of the gaming unit 20 may be determined by the broadcast range of the wireless transceiver 114. If the gaming unit 20 receives a response from a wireless communication device 46 via the wireless transceiver 114, as determined at block 282, the gaming unit 20 may broadcast a connection message to the wireless communication device 46 to establish a connection and bidirectional communication session. If the gaming unit 20 receives a response from the wireless communication device 46, as determined at block 284, the connection may be confirmed at block 285.

Once a connection has been established, at block 286 the routine 280 may request the wireless communication device 46 to provide validation, such as a validation number unique to the wireless communication device 46, a certificate of authenticity, etc., to determine whether or not the wireless communication device 46 is authorized to communicate with the gaming unit 20. If the wireless communication device 46 is not valid as determined at block 287, the routine 280 may cause the gaming unit 20 to transmit a help request to appropriate personnel at 288 and generate a display on the display unit 70 of the gaming unit 20 requesting the player to remain in the vicinity of the gaming unit 20 of block 289.

If, however, the wireless communication device 46 is valid, the routine 280 may determine whether the player has requested a new gaming session at block 290. A new gaming session may be determined by an appropriate gaming instruction received from the wireless communication device 46. In one example, the gaming unit 20 may prompt the player to initiate a new gaming session by generating a display on the display unit 70 and/or generating a sound via the speaker 129 of the wireless communication device 46. If the gaming unit 20 does not receive any input for a new gaming session, or if the player affirmatively rejects a new gaming session, the routine 280 may initiate a termination routine, examples of which are disclosed further below.

If, however, a new gaming session is requested, the routine 280 may cause the gaming unit 20 to request login information from the wireless communication device 46 at block 291. The login information may relate to the player's identification, the player preferences, a spoken password, voiceprint analysis, or any other form of authentication to confirm that the identity of the player corresponds to the identification information stored within the memory of the wireless controller 120. Once provided to the gaming unit 20, the player may be effectively "logged in" to the gaming unit 20 and authenticated at block 292. Although the player's identity may be verified by the wireless controller 120 as disclosed below, the player's identity may also be verified by the controller 100 of the gaming unit 20. For example, the login information may include a voice command, spoken password, spoken identity, etc., which may be transmitted from the wireless controller 120. The controller 100 may retrieve a recorded voiceprint (e.g., from the network computer 22) and compare/analyze the voiceprint of the login information to the recorded voiceprint or the analysis thereof. The gaming unit 20 may notify the wireless controller 120 of the comparison results.

An additional or alternative form of authentication may include a temporal and/or location authentication. In some cases, it may be possible for a player's wireless communication device 46 to be stolen and/or for a player's voice commands to be recorded. The routine 280 may therefore cause the gaming unit 20 to prompt the player to repeat a word or phrase displayed on the display unit 70 and/or repeat a word or phrase communicated to the wireless communication device 46 as an audible message. The word or phrase may vary periodically, and the player-spoken word/phrase may be compared to the prompt. If they are the same, the player may be considered to be at the gaming unit 20 as opposed to a pre-recorded message. In addition, the routine 280 may compare the voiceprint of the player-spoken word or phrase to previously a recorded/analyzed voiceprint to further verify authenticity. A further form of authentication may include verifying that the player is located at the gaming unit 20. Although this may be accomplished via the prompt disclosed above, the locating routine 140, which may be performed by the gaming unit 20, may be used to determine that the wireless communication device 46, and by assumption the player, is located near the gaming unit 20. The connection confirmation at block 285 may also be used to confirm that the wireless communication device 46, and by assumption the player, is located within the broadcast range of the gaming unit 20.

If authenticated, the gaming unit 20 may be adjusted according to the player preferences (e.g., displaying preferred games, preferred game themes, etc.) at block 293. The controller 100 may then continue operating by initiating a game routine, which may be any of the game routines 210, 220, 230, 240, 250 disclosed herein, or the controller 100 may continue with a main operating routine 200, 270, which may be the case if the routine 280 is provided as part of an attraction sequence.

Figure 6C:
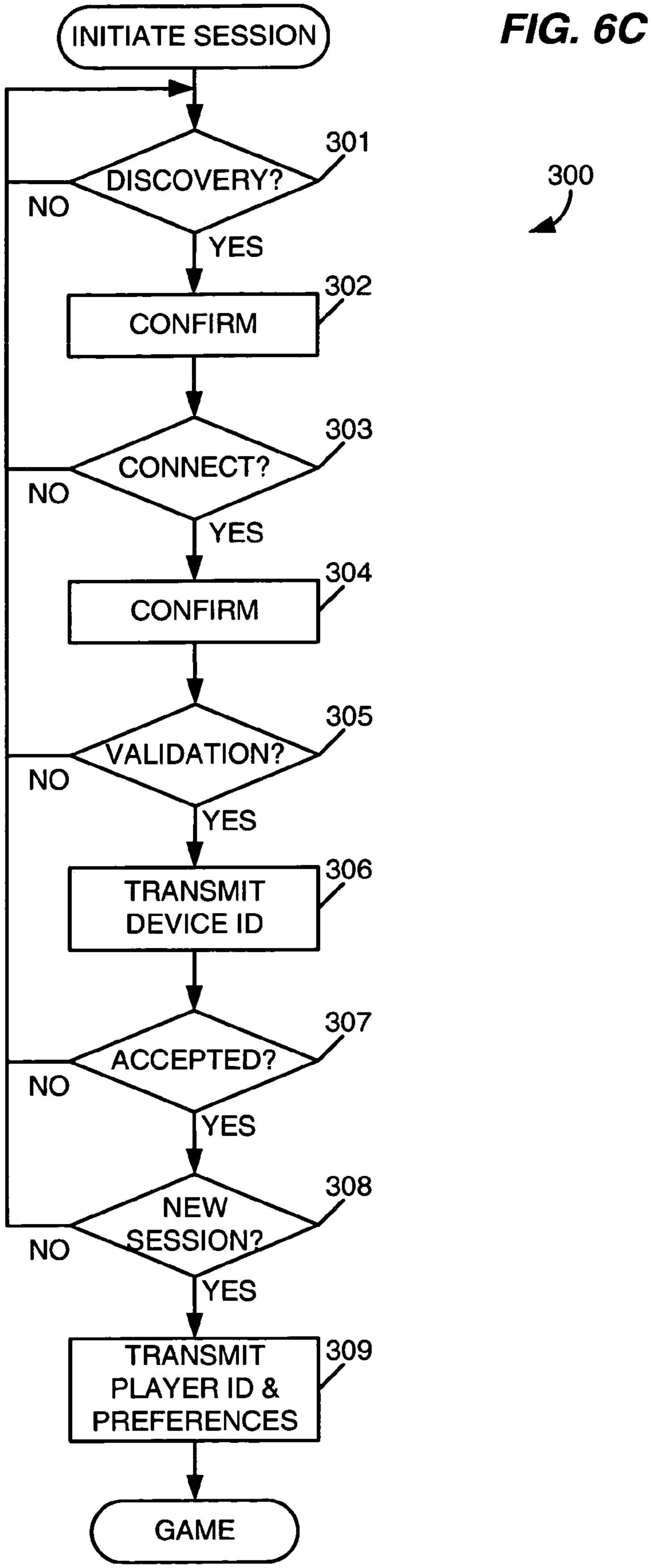
FIG. 6C is a flowchart of the game session routine 300 that may be performed during operation of the wireless communication device.

FIG. 6C is a flowchart of a communication session routine 300 that may be stored in the memory of the wireless controller 120 of the wireless communication device 46. The communication session routine 300 may be utilized by the wireless communication device 46 to initiate a gaming session between the player and the gaming unit 20 by initiating a bidirectional communication between the wireless transceiver 114 of the gaming unit 20 and wireless transceiver 127 of the wireless communication device 46. Referring to FIG. 6C, the communication session routine 300 may begin operation at block 301 during which the wireless communication device 46 may continually determine whether or not a discovery message is being broadcast by a gaming unit 20. If so, the wireless communication device 46 may respond to the discovery message by providing a confirmation message to the gaming unit 20 at block 302. The routine 300 may then detect a connection request message as broadcast by the gaming unit 20 at block 303. If the connection message is not detected, the wireless communication device 46 may continue searching for discovery message being broadcast by other gaming units 20. If the connection message is detected, as determined at block 303, the wireless communication device 46 may provide a confirmation that the connection has been established at block 304.

Having established a bidirectional communication with the gaming unit 20, the wireless communication device 46 may wait for a request for validation information at block 305. If provided, the wireless communication device 46 may transmit an identification unique to the wireless communication device 46 at block 306. If the device identification is accepted by gaming unit 20, as determined at block 307 via a message from the gaming unit 20, the routine 300 may determine whether the player has requested a new gaming session at block 308. A new gaming session may be determined by an appropriate voice command received from the player or based on an input by the player to the gaming unit 20. In one example, the wireless communication device may prompt the player to initiate a new gaming session by generating a sound via the speaker 129 and/or by instructing the gaming unit 20 to generate a display on the display unit 70. If the gaming unit 20 does not receive any input for a new gaming session, or if the player affirmatively rejects a new gaming session, the routine 300 may return control to block 301.

If a new gaming session is initiated by the player, as determined at block 308 the wireless communication device 46 may transmit the player identification and player preferences at block 309 for authentication and adjustment of the gaming unit 20 according to the player preferences. The wireless communication device 46 may then continue communicating with the gaming unit 20 during operation of a game routine, which may be any of the game routines 210, 220, 230, 240, 250 disclosed herein, or the wireless communication device 46 may continue communicating with the gaming unit 20 during operation of a main operating routine 200, 270.

Figure 6D:
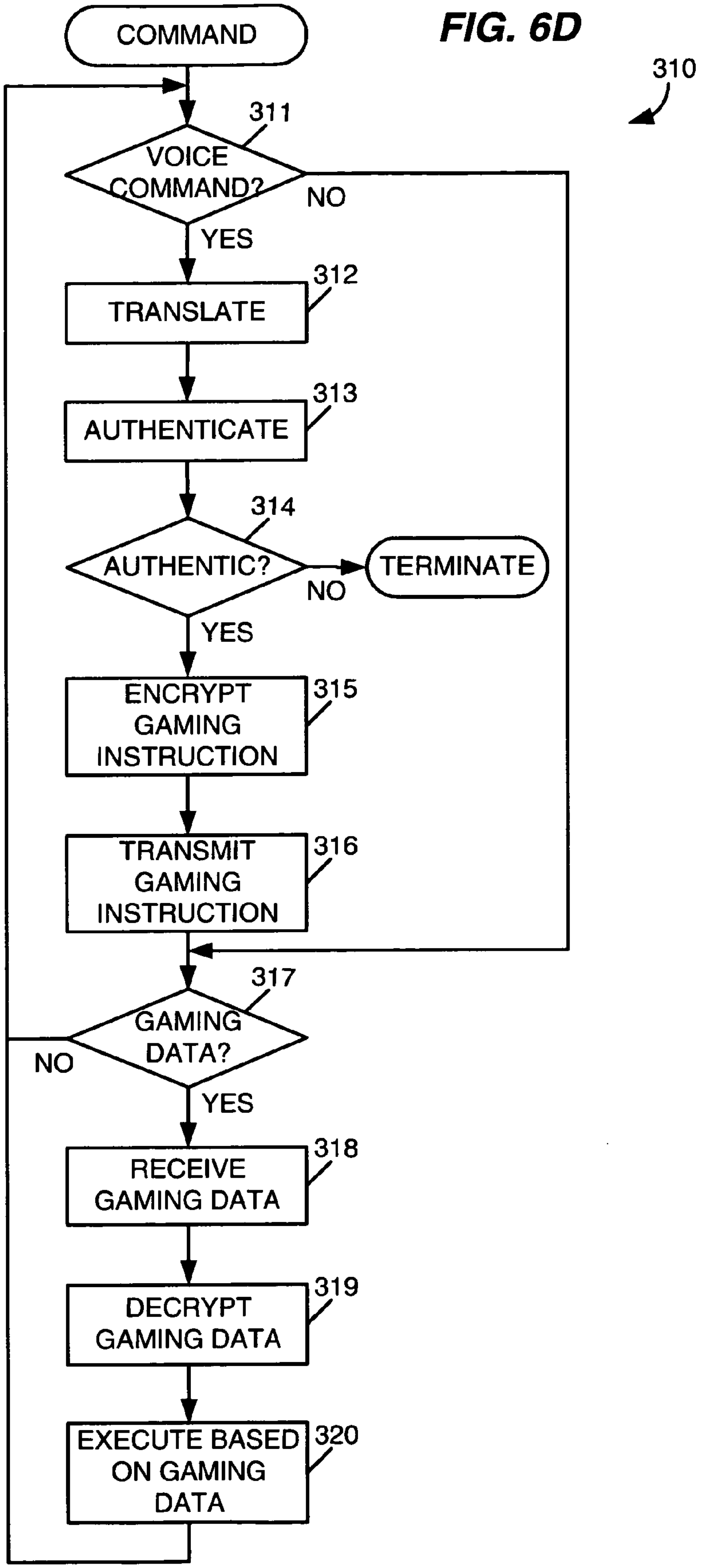
FIG. 6D is a flowchart of a control routine that may be performed during operation of the wireless communication device.

FIG. 6D is a flowchart of a control routine 310 that may be stored in the memory of the wireless controller 120 of the wireless communication device 46. The control routine 310 may provide the player with a voice activated interface and control over the gaming unit 20. Referring to FIG. 6D, the control routine 310 may begin operation at block 311 during which the player may provide a voice command to the wireless the communication device 46 via the microphone 126. The voice command may be provided as individual commands, such as "select 2 lines," "5 credits per line," "$1 wager," whereby the wireless communication device 46 may separately transmit gaming function data to the gaming unit 20 for each command, and the gaming unit 20 may separately perform a gaming function in response to each command. In another example, a voice command may include a string of functions to be executed, such as "select 2 lines, 5 credits per line, $1 wager," whereby the wireless communication device 46 may collectively transmit gaming function data that includes each function, and the gaming unit 20 may execute multiple gaming functions in response to each item listed in the voice command. Each voice command may be punctuated by a word or phrase such as "execute" to cause the gaming unit 20 to execute the gaming function.

Using a voice recognition routine, the wireless communication device 46 may interpret and translate the voice command into data relating to a gaming function at block 312. In one example, the gaming function may relate to a gaming instruction, such as a wager amount, a pay line selection, a number selection, a card selection, deal, draw, hit, stay, etc. However, it should also be understood that the voice command may relate to additional functions such as viewing or transferring financial information, ordering food or drink, etc. Because some gaming environments may have a large amount of background noise, the voice recognition software may take background noise into account to isolate a voice command. In one example, the voice recognition software may be calibrated to determine the level and nature of the background noise, and cancel such noise when awaiting or receiving a voice command. The calibration may be performed periodically to account for variations in background noise. The control routine 310 may further record the voice command within a memory of the wireless controller 120 to provide an audit trail of the player's gaming selections, wagers, etc. The audit trail may be associated with the player and/or the player's gaming sessions.

The control routine 300 may verify the authenticity of the player's identity at block 313 by comparing voiceprint of the voice command to recorded voiceprints stored in the memory of the wireless controller 120. As such, each voice command may result in an authentication process to verify the player as the source of the command. If the player's identification is authentic as determined at block 314, the wireless communication device 46 may encrypt the data relating to the gaming function associated with the voice commend at block 315. If the player's identification is not authenticated as determined at block 314, the bidirectional communication with the gaming 20 may be terminated. The encrypted data may be transmitted at block 316 to the gaming unit 20. Alternatively, or in addition, the controller 100 of the gaming unit 20 may authenticate the player's identity, as disclosed above, and the wireless controller 120 may be provided with the results of the authentication.

After transmitting the gaming function data to the gaming unit 20 at block 316, or if the player has not provided a voice command as determined at block 311, the wireless communication device 46 may determine whether or not gaming data has been received from the gaming unit 20 at block 317. If not, the wireless communication device 46 may continue to wait for a voice command from the player. If gaming data is received from gaming unit 20, such gaming data may be received at block 318 and decrypted, if necessary, at block 319. The gaming data from the gaming unit 20 may relate to any data which may be provided to the wireless communication device 46, including, but not limited to, financial information (e.g., account balance, winnings, balance transfers), confirmation of gaming instruction, updates on drink or food orders, promotions, updates on dinner or show reservations, etc. Having received and decrypted the gaming data, the wireless communication device 46 may execute a function based on the gaming data at block 320. In some cases, the function may include translating the gaming data into audio played to the player via the speaker 129. In other cases, the gaming data may result in the execution of functions such as transferring funds, updating information (e.g., player preferences, account balance, etc.) stored on the memory of the wireless controller 120, etc.

Figure 6E:
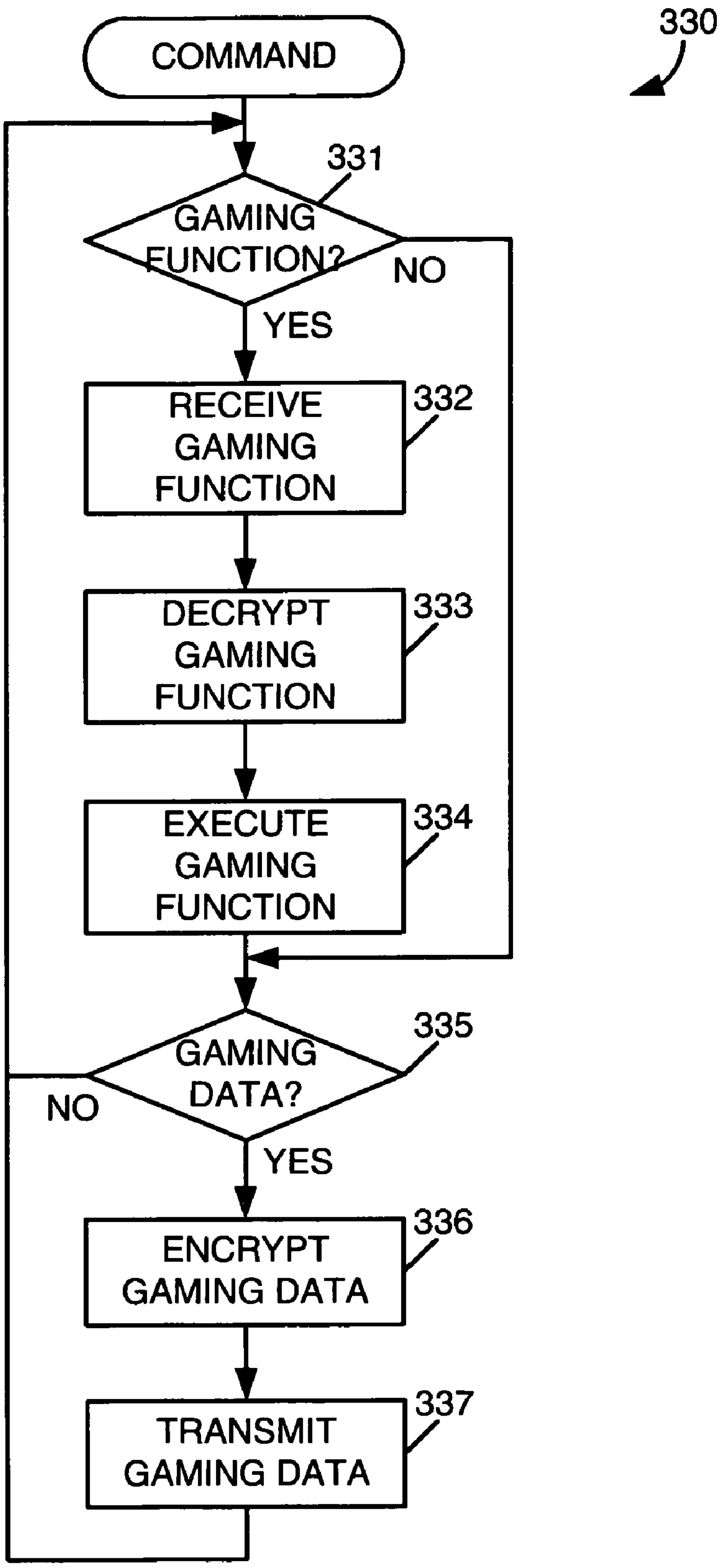
FIG. 6E is a flowchart of a control routine that may be performed during operation of one or more of the gaming units.

FIG. 6E is a flowchart of a control routine 330 that may be stored in the memory of the controller 100 of the gaming unit 20. Referring to FIG. 6E, the control routine 330 may begin operation at block 331 during which the gaming unit 20 may determine whether or not gaming function data has been received from the wireless communication device 46 via the wireless transceiver 114. As mentioned above, the gaming function data may relate to various types of information to cause the gaming unit 20 to execute a function in response thereto, including, but not limited to, gaming instructions, financial instructions, food or drink orders, etc. If gaming function data is detected at block 331, the gaming function data may be received at block 332 and decrypted at block 333. In addition to decrypting the gaming function data, the gaming unit 20 may verify the authenticity of the player's identity, including, but not limited to, verifying the player's voiceprint if the gaming function data comprises a voice command. The gaming unit 20 may then interpret the gaming function data and execute a function in response thereto at block 334. The function may relate to a game being played (e.g., a wager amount, game selection, cash out option, etc.). However, the function may further relate to additional information such as the choice of a game theme, drink order, food order, a financial transaction, a maintenance function request, etc. The gaming unit 20 may further store the gaming function data as part of an audit trail relating to the player and/or the gaming session. If the gaming function data is provided as a voice command, the gaming unit 20 may record and store the voice command, or the voice command (and associated gaming function data) may be provided to a centralized storage system or server such as the network computer 22 and stored as audit trail data.

In response to executing the gaming function at block 334, or if no gaming function data is received as determined at block 331, the gaming unit 20 may determine whether any gaming data is to be transmitted to the wireless communication device 46 at block 335. If not, the routine 330 may continue to wait for gaming function data from the wireless communication device 46. However, if the gaming unit 20 has gaming data to provide to the wireless communication device 46, the gaming unit 20 may encrypt the gaming data at block 336 and transmit the gaming data at 337. As mentioned above, the gaming data may relate to confirmation of a player instruction, an advertisement, music, information related to the outcome of the execution of the gaming function at block 334, etc.

Figure 7:
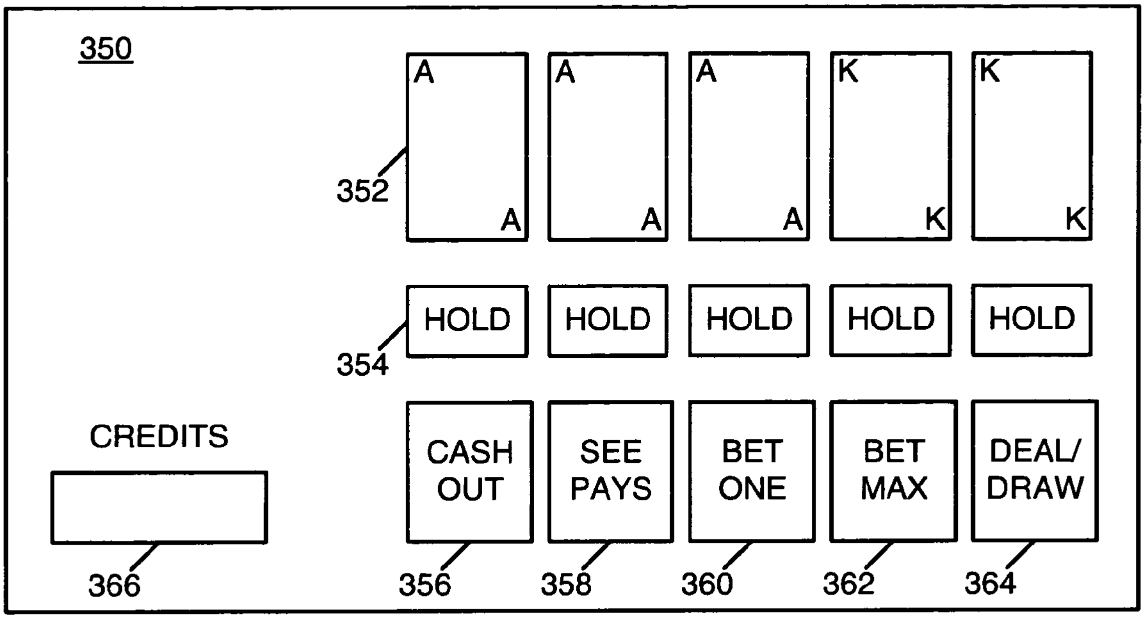
FIG. 7 is an illustration of an embodiment of a visual display that may be displayed during performance of the video poker routine of FIG. 9.

Video Poker

Where the gaming unit 20 is designed to facilitate play of a video poker game, the display unit 70 may comprise a video display unit. FIG. 7 is an exemplary display 350 that may be shown on the display unit 70 during performance of the video poker routine 210 shown schematically in FIG. 6. Referring to FIG. 7, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 9:
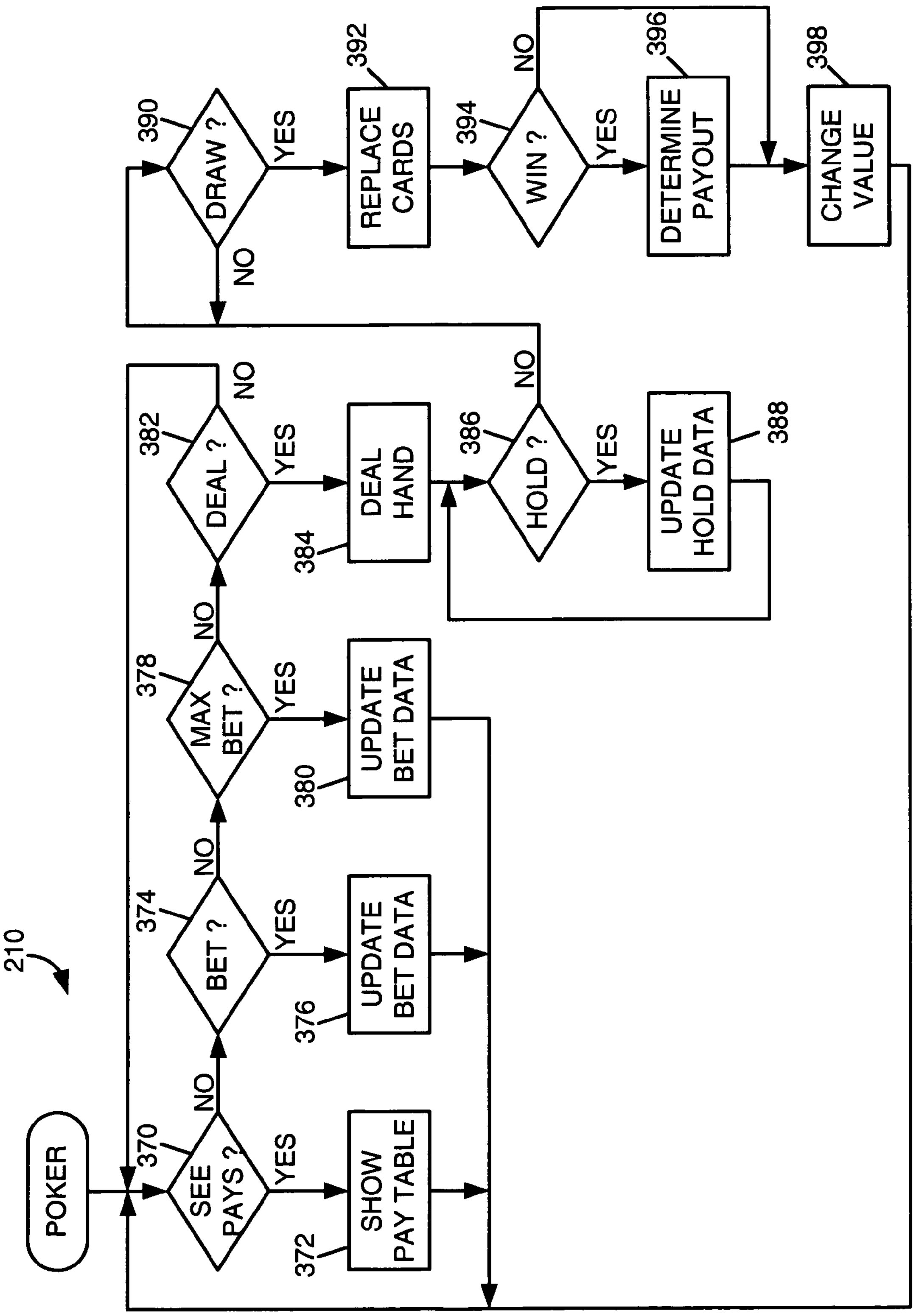
FIG. 9 is a flowchart of an embodiment of a video poker routine that may be performed by one or more of the gaming units.

FIG. 9 is a flowchart of the video poker routine 210 shown schematically in FIG. 6. Referring to FIG. 9, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may-be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 7).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 8:
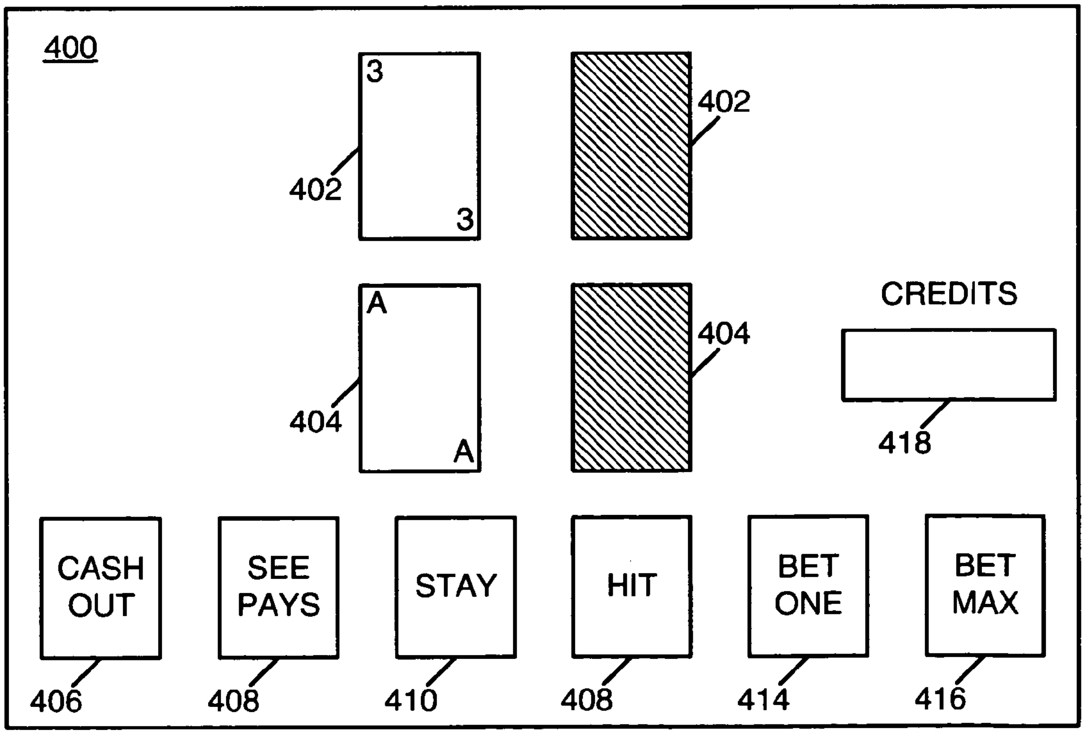
FIG. 8 is an illustration of an embodiment of a visual display that may be displayed during performance of the video blackjack routine of FIG. 10.

Video Blackjack

Where the gaming unit 20 is designed to facilitate play of a video blackjack game, the display unit 70 may comprise a video display unit. FIG. 8 is an exemplary display 400 that may be shown on the display unit 70 during performance of the video blackjack routine 220 shown schematically in FIG. 6. Referring to FIG. 8, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 10:
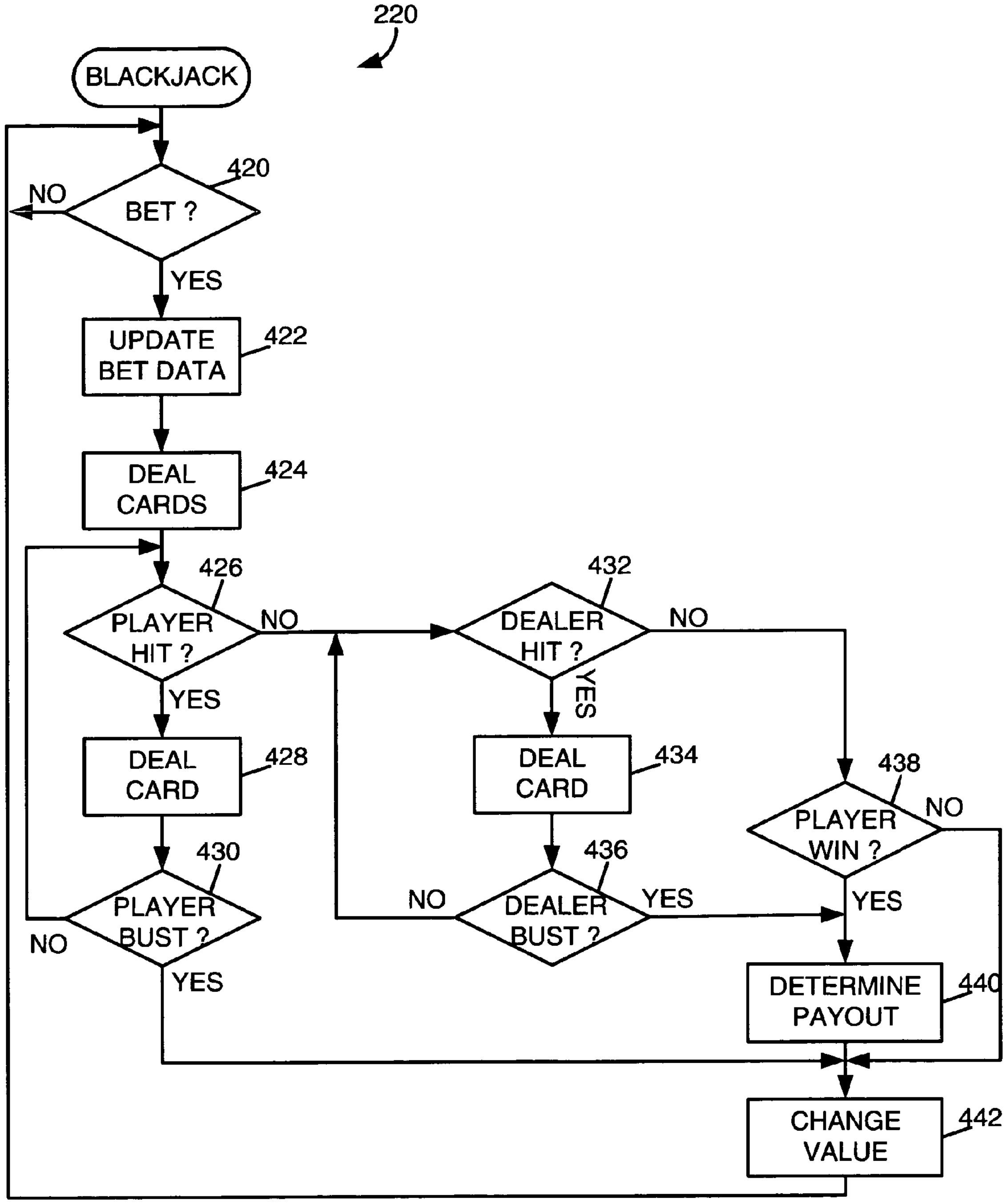
FIG. 10 is a flowchart of an embodiment of a video blackjack routine that may be performed by one or more of the gaming units.

FIG. 10 is a flowchart of the video blackjack routine 220 shown schematically in FIG. 6. Referring to FIG. 10, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 8).

Figure 11:
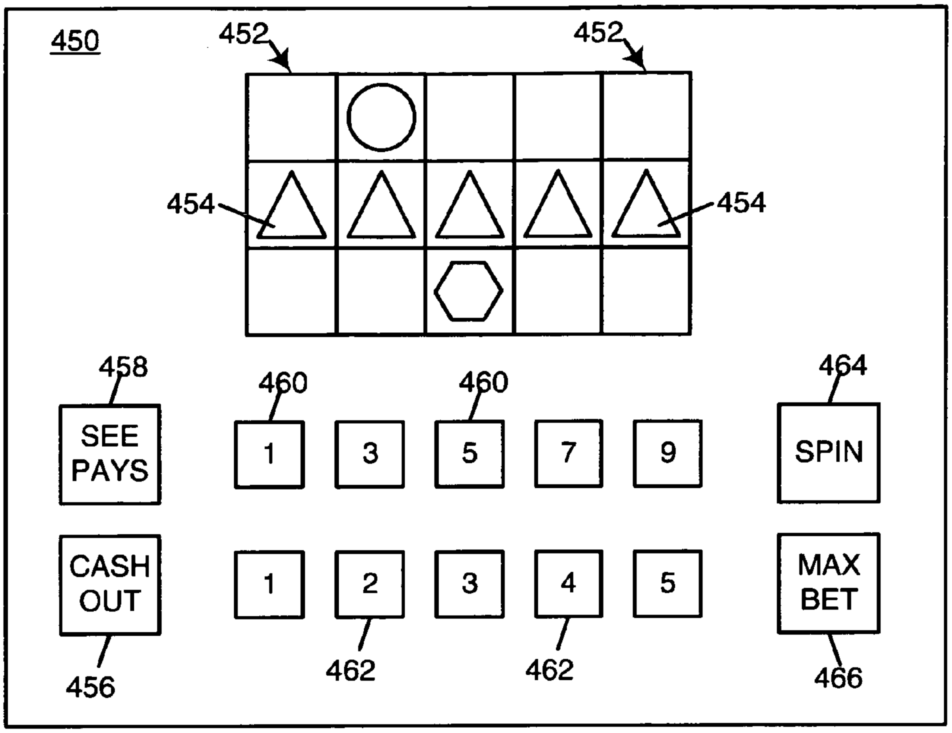
FIG. 11 is an illustration of an embodiment of a visual display that may be displayed during performance of the slots routine of FIG. 13.

Slots

Where the gaming unit 20 is designed to facilitate play of a video slots game, the display unit 70 may comprise a video display unit. FIG. 11 is an exemplary display 450 that may be shown on the display unit 70 during performance of the slots routine 230 shown schematically in FIG. 6. Referring to FIG. 11, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 13:
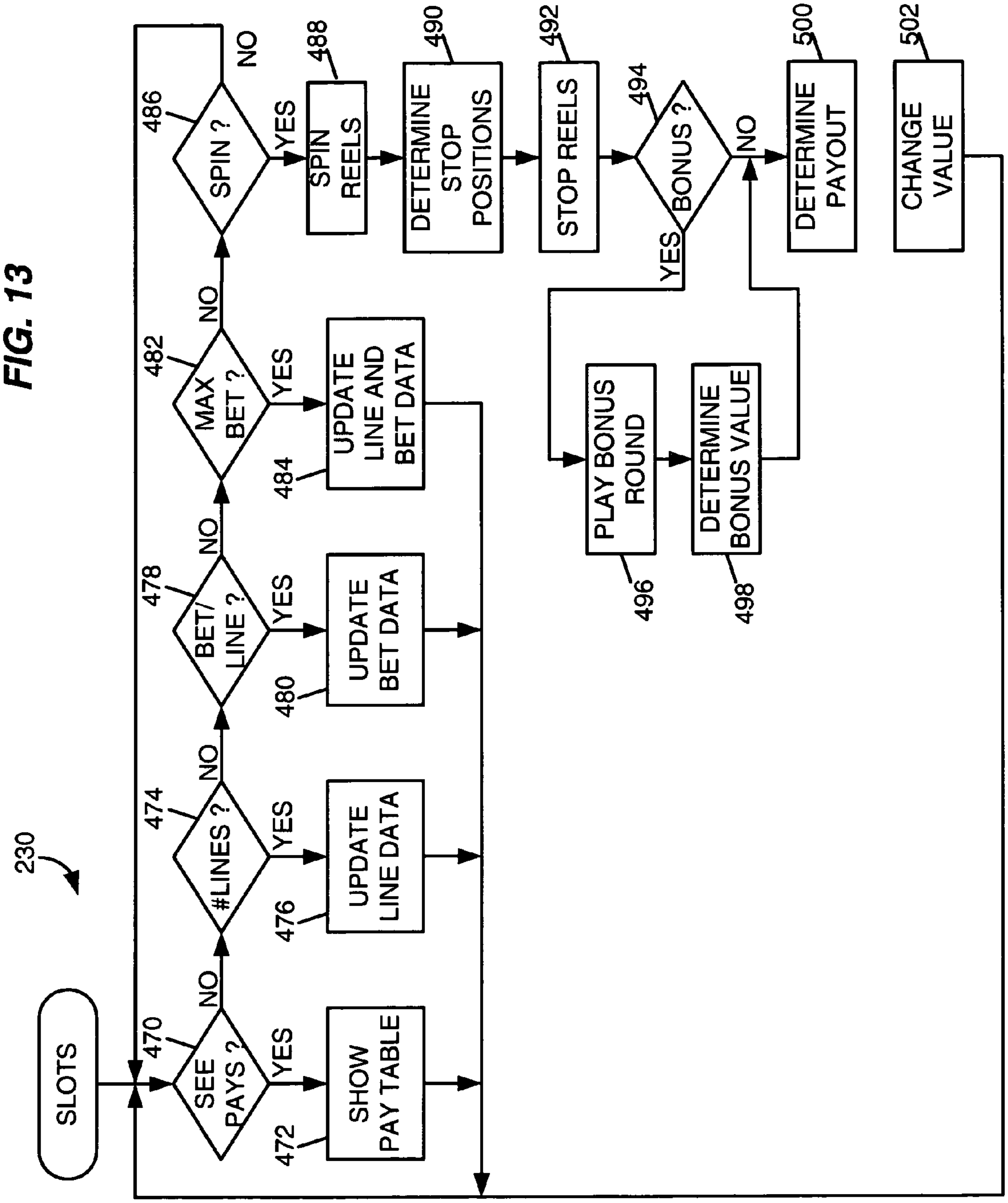
FIG. 13 is a flowchart of an embodiment of a slots routine that may be performed by one or more of the gaming units.

FIG. 13 is a flowchart of the slots routine 230 shown schematically in FIG. 11. Referring to FIG. 13, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Figure 12:
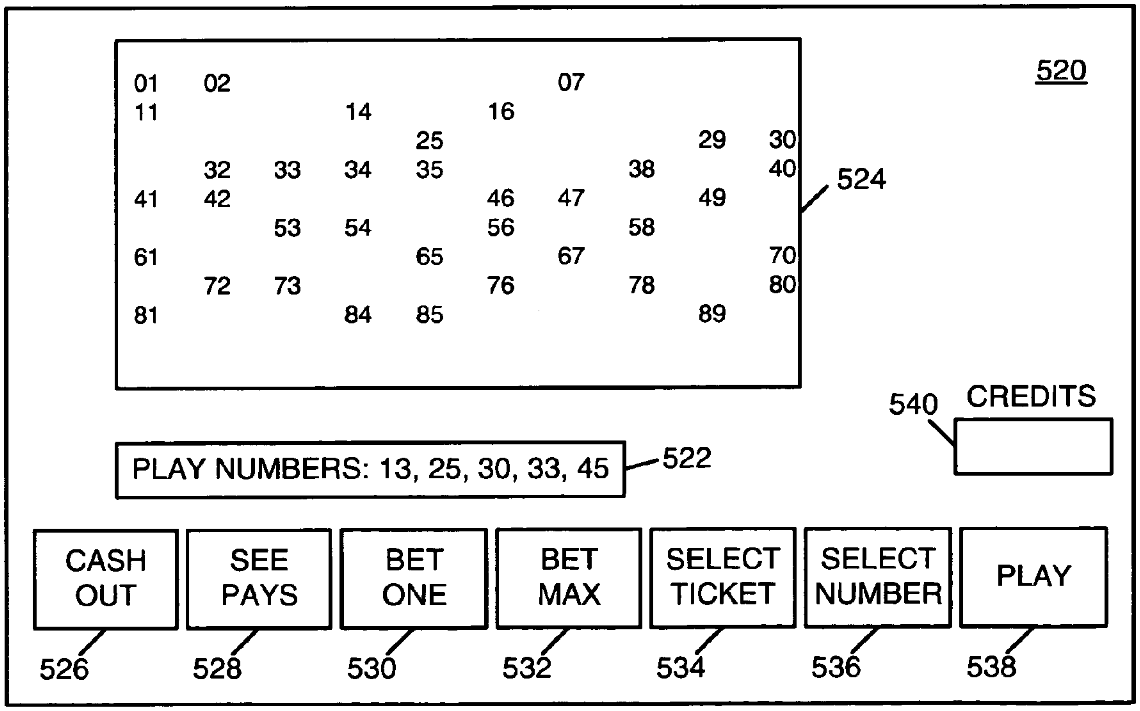
FIG. 12 is an illustration of an embodiment of a visual display that may be displayed during performance of the video keno routine of FIG. 14.

Video Keno

Where the gaming unit 20 is designed to facilitate play of a video keno game, the display unit 70 may comprise a video display unit. FIG. 12 is an exemplary display 520 that may be shown on the display unit 70 during performance of the video keno routine 240 shown schematically in FIG. 6. Referring to FIG. 12, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 14:
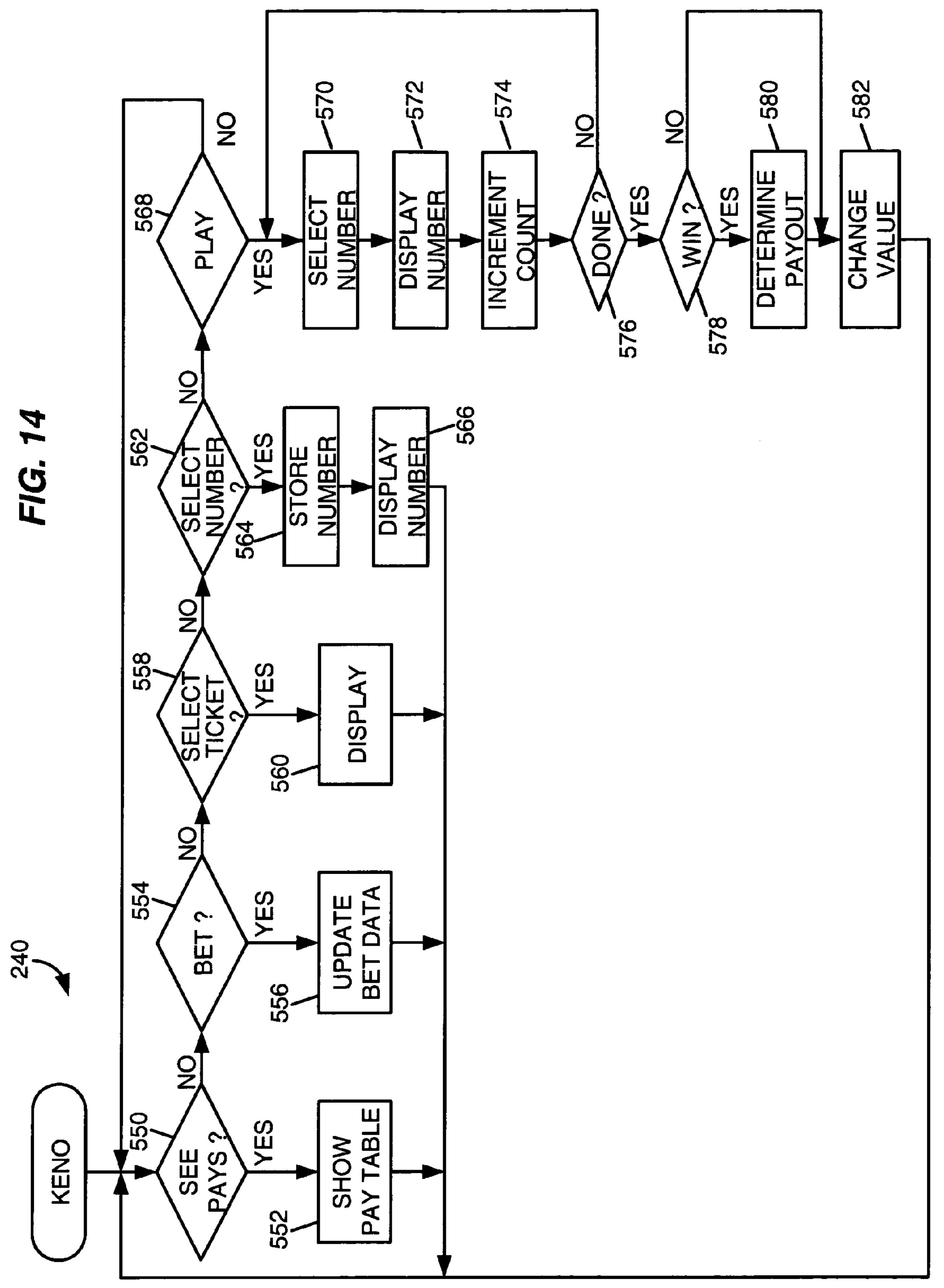
FIG. 14 is a flowchart of an embodiment of a video keno routine that may be performed by one or more of the gaming units.

FIG. 14 is a flowchart of the video keno routine 240 shown schematically in FIG. 6. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 14, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 12).

Figure 15:
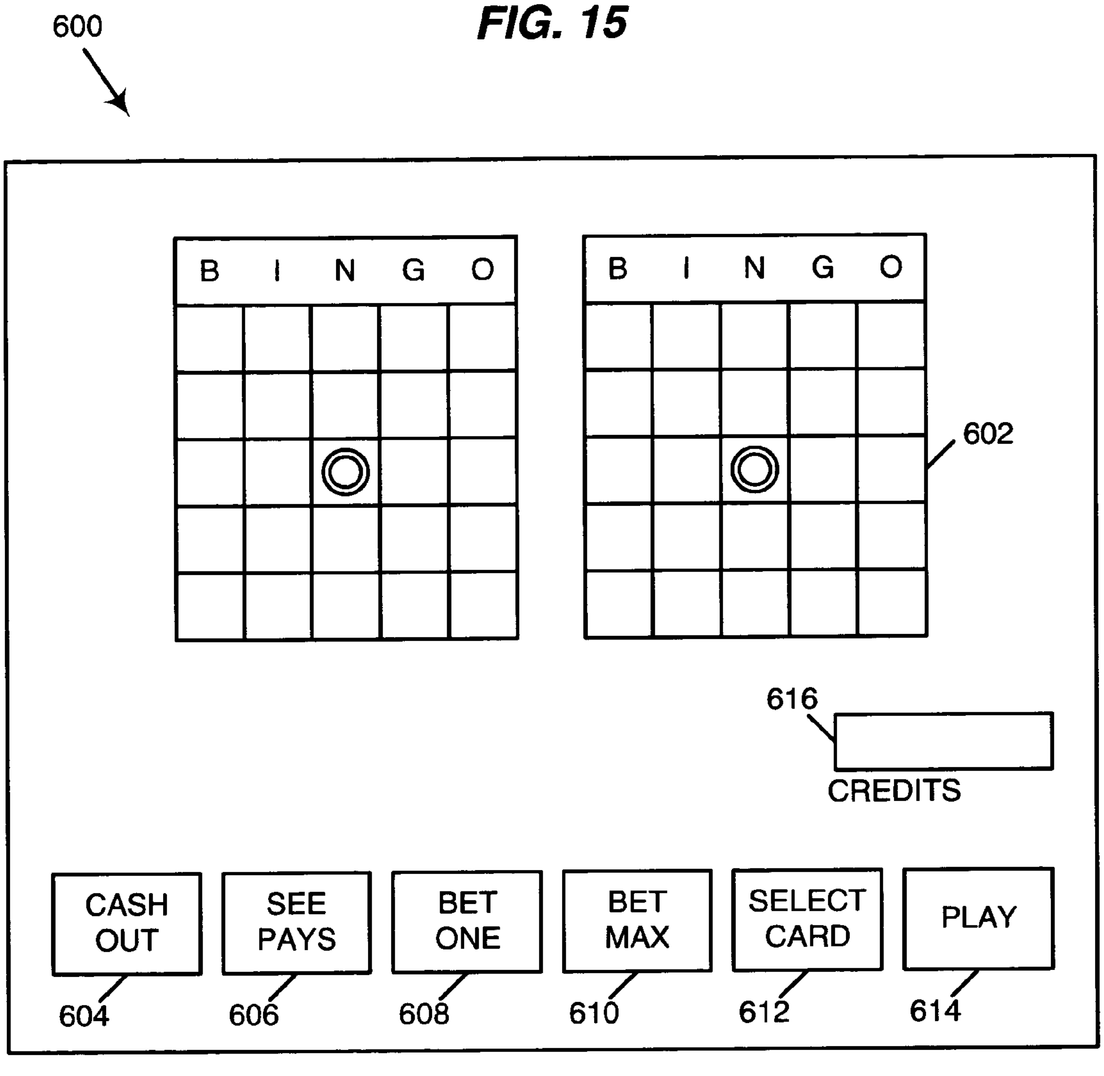
FIG. 15 is an illustration of an embodiment of a visual display that may be displayed during performance of the video bingo routine of FIG. 16.

Video Bingo

Where the gaming unit 20 is designed to facilitate play of a video bingo game, the display unit 70 may comprise a video display unit. FIG. 15 is an exemplary display 600 that may be shown on the display unit 70 during performance of the video bingo routine 250 shown schematically in FIG. 6. Referring to FIG. 15, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 16:
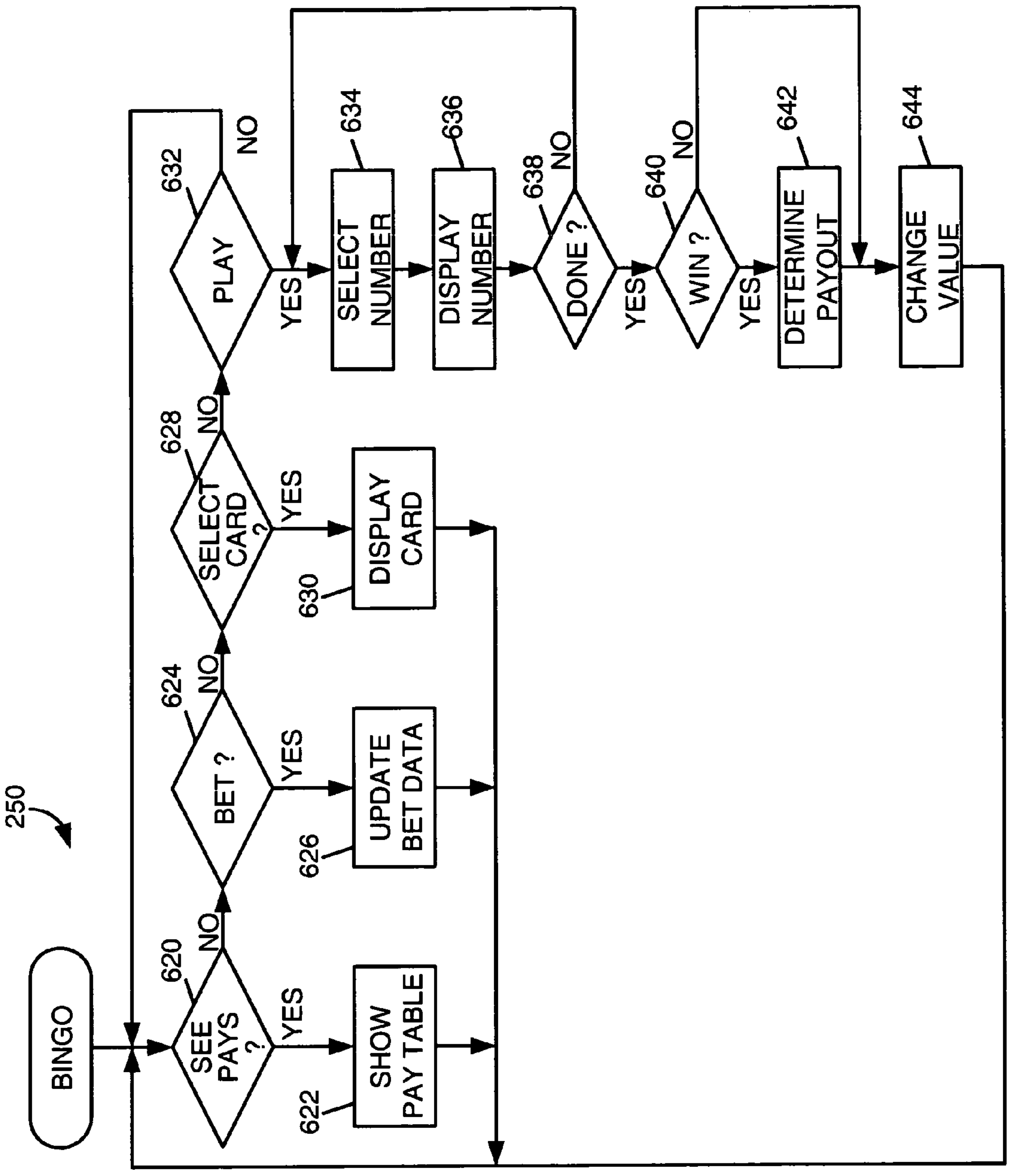
FIG. 16 is a flowchart of an embodiment of a video bingo routine that may be performed by one or more of the gaming units.

FIG. 16 is a flowchart of the video bingo routine 250 shown schematically in FIG. 6. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 16, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Communication Termination

Figure 17:
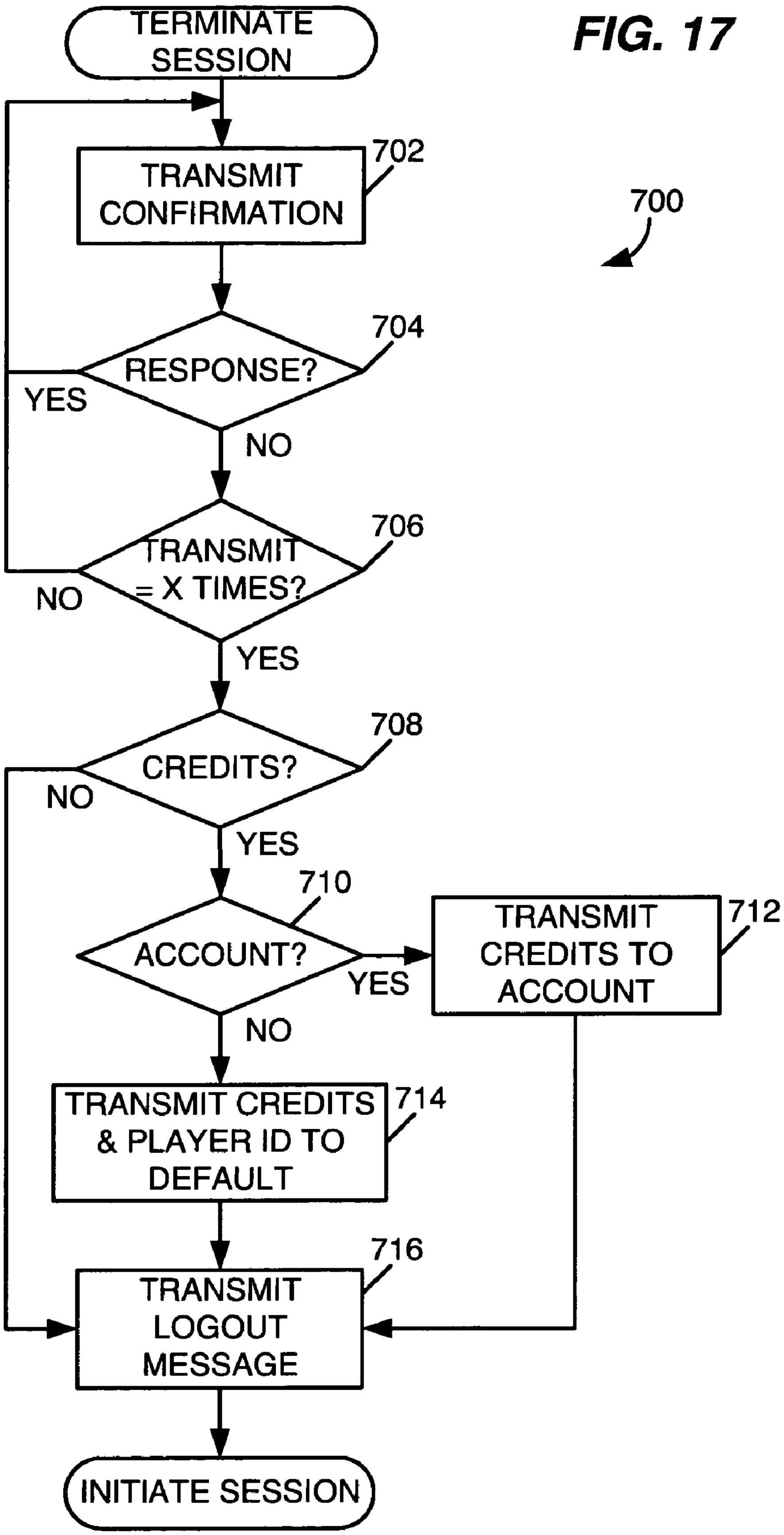
FIG. 17 is a flowchart of a communication session termination routine that may be performed during operation of one or more of the gaming units.

FIG. 17 is a flowchart of a communication session termination routine 700 that may be stored in the memory of the controller 100 of the gaming unit 20. The termination routine 700 may be used to automatically terminate the bidirectional communication link with the wireless communication device 46, due to inactivity (e.g., the player walking away from the gaming unit). Referring to FIG. 17, the termination routine 700 may begin operation at block 702 during which a confirmation message is transmitted to the wireless communication device 46 to confirm whether the wireless communication device 46 (and hence the player) is within the vicinity of the gaming unit 20. The confirmation message may be transmitted periodically during the bidirectional communication session with the wireless communication device 46.

If the wireless communication device 46 provides a response as determined at block 704, the bidirectional communication link may continue and gaming unit 20 may transmit another confirmation message after a predetermined interval. If there is no response from the wireless communication device 46 as determined at block 704, the gaming unit 20 may determine how many times a confirmation has been transmitted without a response at block 706. If the number of confirmation requests that have been transmitted without a response do not equal a predetermined amount, the gaming unit 20 may continue to transmit a confirmation and wait for a response. However, if the confirmation message has been transmitted without a response for a predetermined number of times as determined at block 706, the routine 700 may determine whether a credit balance remains on the gaming unit 20 that has not been downloaded to a player account or to the wireless communication device 46 at block 708.

If no such credits exist, the gaming unit 20 may transmit a message to the network computer 22 indicating that the player is no longer logged on to the gaming unit 20. However, if credits exist, as determined at block 708, gaming unit 20 may determine whether or not the player has an electronic account at block 710. If so, the gaming unit 20 may electronically transmit the credit balance to the player's account at block 712 and proceed to log the player off of the gaming unit 20 at block 716. However, if the player does not have an account, the gaming unit 20 may attribute the credit balance to the player identification and transmit both to a default account at block 714, which may later be reclaimed by the player. The gaming unit 20 may then log the player off of the gaming unit 20 at block 716. Once the player is logged out of the gaming unit 20, the gaming unit 20 may proceed to establish contact with another wireless communication device 46 (and hence another player).

Figure 18:
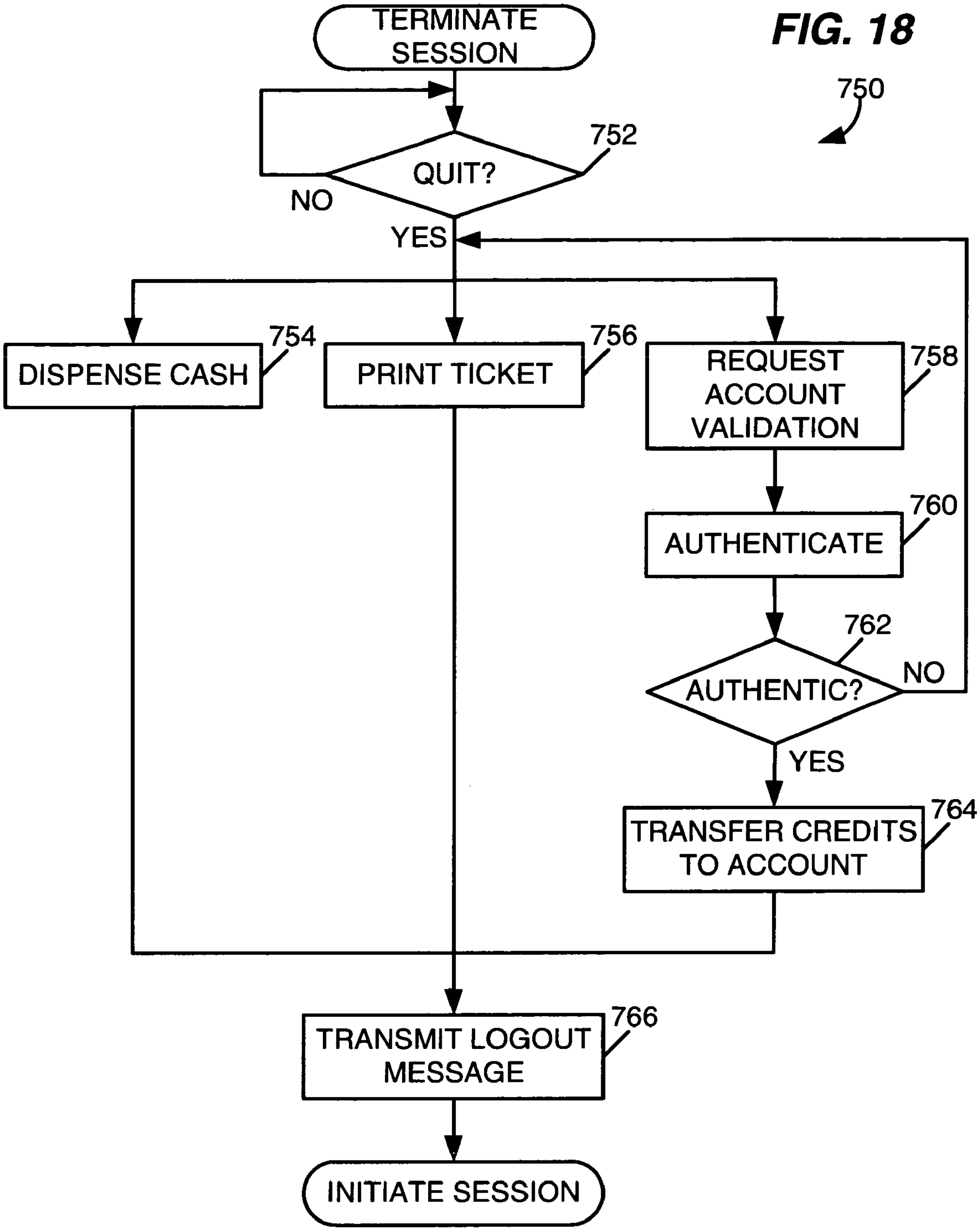
FIG. 18 is a flowchart of an alternative communication session termination routine that may be performed during operation of one or more of the gaming units.

FIG. 18 is a flowchart of an alternative communication session termination routine 750 that may be stored in the memory of the controller 100 of the gaming unit 20. The termination routine 750 may be utilized when a player decides to log off the gaming unit 20. Referring to FIG. 18, the termination routine 750 may begin operation at block 752 during which the gaming unit 20 may determine whether or not the player has decided to log off the gaming unit 20 and terminate the bidirectional communication link. The determination at block 752 may be made by detecting the cash out option, a quit option, or other termination option as selected by the player by pressing a button or issuing a voice command. If such a selection is made, as determined at block 752, any credit balance may be provided to the player by the number of options, which may be selected by the player. For example, the gaming unit 20 may dispense cash to the player at block 754 via the coin payout tray 64, print a ticket voucher 60 which may be redeemed for cash at block 756, or electronically transfer the funds to the player account.

The funds may be electronically transmitted to a player account by requesting account validation from the wireless communication device 46 at block 758. The account validation may relate to an account number, a routing number, a pass code, a voice print analysis, etc., or any other information uniquely identifying the account with the player. Once provided, the gaming unit may proceed at block 760 to authenticate the information provided at block 758. For example, the gaming unit 20 may compare the account number and routing number with the player identification provided at the beginning of the bidirectional communication session. Alternatively, the gaming unit 20 may compare the information to information stored in the network computer 22. If the account information has been authenticated, as determined at block 762, the gaming unit 20 may transfer the credit balance to the account at block 764. Otherwise, the gaming unit 20 may prompt the player to select another form of receiving the funds.

Having dispensed the credit balance at blocks 754, 756 or 764, the gaming unit 20 may transmit a message to the player via the wireless communication device 46 and/or the display unit 70, indicating that the player is no longer logged onto the gaming unit 20 at block 766. The gaming unit 20 may then proceed to initiate a new communication session with a nearby wireless communication device 46.

What is claimed is:

1. A gaming system, comprising:

a wireless communication device comprising a first wireless transceiver and a first controller operatively coupled to said first wireless transceiver, said first controller comprising a first processor and a first memory operatively coupled to said first processor, said first controller being programmed to:

determine based on voice characteristic of a human voice whether to initiate a bidirectional wireless communication link with a gaming apparatus when in proximity to said gaming apparatus, wherein said gaming apparatus is operable for determining an outcome for a game of chance, receive a voice command in a human voice prior to establishing said bidirectional wireless communication link, wherein said voice command relates to a first gaming function, authenticating said human voice by comparing a voice characteristic of said human voice to a predetermined voice characteristic of said human voice stored for authentication of said human voice, prevent said bidirectional wireless communication link with said gaming apparatus if said voice characteristic of said human voice does not correspond to said predetermined voice characteristic of said human voice, allow said bidirectional wireless communication link with said gaming apparatus if said voice characteristic of said human voice command corresponds to said predetermined voice characteristic of said human voice, transmit data relating to said first gaming function to said gaming apparatus via said first wireless transceiver, and receive data relating to a second gaming function from said gaming apparatus via said first wireless transceiver;

wherein said gaming apparatus comprises a display unit, a second wireless transceiver and a second controller operatively coupled to said display unit and said second wireless transceiver, said second controller comprising a second processor and a second memory operatively coupled to said second processor, said second controller being programmed to:

receive said first gaming function data via said second wireless transceiver, execute a first gaming function based on said first gaming function data, transmit said second gaming function data to said wireless communication device via said second wireless transceiver, cause said display unit to generate a game display relating to one of the following games: poker, blackjack, slots, keno or bingo, and determine a value payout associated with an outcome of said game.

2. A gaming system as defined in claim 1, wherein said first controller is programmed to establish said bidirectional communication link based on a player identification.

3. A gaming system as defined in claim 1, wherein said voice command comprises a particular language and wherein said first controller is programmed to recognize said language.

4. A gaming system as defined in claim 1, wherein said first controller is programmed to be calibrated to cause said first controller to relate said voice command to said first gaming function data.

5. A gaming system as defined in claim 1, wherein said voice command relates to a plurality of gaming functions, wherein said first controller is programmed to transmit data relating to said plurality of gaming functions to said gaming apparatus via said first wireless transceiver, wherein said second controller is programmed to receive said plurality of gaming functions data via said second wireless transceiver, wherein said second controller is programmed to execute a plurality of gaming functions based on said plurality of gaming functions data.

6. A gaming system as defined in claim 1, wherein said first controller is programmed to distinguish said voice command from sounds unrelated to said voice command.

7. A gaming system as defined in claim 1, wherein said first controller is programmed to encrypt said first gaming function data, wherein said second controller is programmed to decrypt said first gaming function data.

8. A gaming system as defined in claim 1, wherein said second controller is programmed to encrypt said second gaming function data, wherein said first controller is programmed to decrypt said second gaming function data.

9. A gaming system as defined in claim 1, wherein at least one of said first controller and said second controller is programmed to record said voice command.

10. A gaming system as defined in claim 9, wherein at least one of said first controller and said second controller is programmed to store said recorded voice command as audit trail data for subsequent authentication of said voice.

11. A gaming system as defined in claim 1, wherein said second controller is programmed to cause one or more of the following: cause said display unit to generate a display relating to at least one word or cause said gaming apparatus to transmit an audio message relating to said at least one word to said first controller, wherein said second controller is programmed to receive data relating to at least one repeated word from said first controller, wherein said second controller is programmed to prevent said bidirectional wireless communication link with said wireless communication device if said at least one repeated word does not correspond to said at least one word, wherein said second controller is programmed to allow said bidirectional wireless communication link with said gaming apparatus if said at least one repeated word corresponds to said at least one word.

12. A gaming system as defined in claim 1, wherein said second controller is programmed to locate said wireless communication apparatus, wherein said second controller is programmed to prevent said bidirectional wireless communication link with said wireless communication device if said wireless communication apparatus is not located proximate to said gaming apparatus, wherein said second controller is programmed to allow said bidirectional wireless communication link with said gaming apparatus if said wireless communication apparatus is located proximate to said gaming apparatus.

13. A gaming system as defined in claim 1, wherein said first gaming function data relates to a gaming instruction for said game, wherein said second controller is programmed to execute said game instruction.

14. A gaming system as defined in claim 1, wherein said first gaming function data relates to a financial transaction, wherein said second controller is programmed to execute said financial transaction.

15. A gaming system as defined in claim 1, wherein said first gaming function data relates to a drink order, wherein said second controller is programmed to transmit data relating to said drink order.

16. A gaming system as defined in claim 1, wherein said first gaming function data relates to a food order, wherein said second controller is programmed to transmit data relating to said food order.

17. A gaming system as defined in claim 1, wherein said first gaming function data relates to a reservation request, wherein said second controller is programmed to transmit data relating to said reservation request.

18. A gaming system as defined in claim 1, wherein said first gaming function data relates to a request for assistance, wherein said second controller is programmed to transmit data relating to said request for assistance.

19. A gaming system as defined in claim 1, wherein said first gaming function data relates to an authorized access request, wherein said second controller is programmed to grant access to one or more of the following: a maintenance function of said gaming apparatus or a service function of said gaming apparatus.

20. A gaming system as defined in claim 1, wherein said first controller is programmed to transmit data relating to a player identification to said gaming apparatus via said first wireless transceiver, wherein said second controller is programmed to receive said player identification data via said second wireless transceiver, wherein said second controller is programmed to cause said display unit to generate a display relating to said player identification, and cause said gaming apparatus to transmit an audio message relating to said player identification to said first controller.

21. A gaming system as defined in claim 1, wherein said first controller is programmed to transmit data relating to a player preference to said gaming apparatus via said first wireless transceiver, wherein said second controller is programmed to receive said player preference data via said second wireless transceiver, wherein said second controller is programmed to cause one or more of the following: cause said display unit to generate a display relating to said player preference or cause said gaming apparatus to transmit an audio message relating to said player preference to said first controller.

22. A gaming system as defined in claim 1, wherein said second gaming function data relates to one of the following: confirmation of said execution of said first gaming function, said outcome, said value payout, an advertisement, or a promotion.

23. A gaming system as defined in claim 1, wherein said first controller is programmed to transmit data relating to a player identification to said gaming apparatus via said first wireless transceiver, wherein said second controller is programmed to receive said player identification data via said second wireless transceiver, wherein said second controller is programmed to transmit data relating to said gaming apparatus location to a network computer.

24. A gaming system as defined in claim 1, wherein said second controller is programmed to determine if said wireless communication device is in proximity to said gaming apparatus, wherein said second controller is programmed to terminate said bidirectional communication link if said wireless communication device is not in proximity to said gaming apparatus.

25. A gaming system as defined in claim 1, wherein said first controller is programmed to transmit said data relating to said first gaming function in accordance with a status associated with a user of said wireless communication device.

26. A gaming apparatus, comprising:

a display unit;

a value input device;

a wireless transceiver;

a controller operatively coupled to said display unit, said value input device and said wireless transceiver, said controller comprising a processor and a memory operatively coupled to said processor, said first controller being programmed to: determine based on voice characteristic of a human voice whether to initiate a bidirectional wireless communication link with a gaming apparatus when in proximity to said gaming apparatus, wherein said gaming apparatus is operable for determining an outcome for a game of chance receive a voice command in a human voice prior to establishing said bidirectional wireless communication link, wherein said voice command relates to a first gaming function, authenticating said human voice by comparing a voice characteristic of said human voice to a predetermined voice characteristic of said human voice stored for authentication of said human voice, prevent said bidirectional wireless communication link with said gaming apparatus if said voice characteristic of said human voice does not correspond to said predetermined voice characteristic of said human voice, allow said bidirectional wireless communication link with said gaming apparatus if said voice characteristic of said human voice command corresponds to said predetermined voice characteristic of said human voice execute a first gaming function in response to said first gaming function data, transmit data relating to a second gaming function to said wireless communication device via said wireless transceiver, cause said display unit to generate a game display relating to one of the following games: poker, blackjack, slots, keno or bingo, and determine a value payout associated with an outcome of said game.

27. A gaming apparatus as defined in claim 26, wherein said display unit comprises a video display unit that is capable of generating video images.

28. A gaming apparatus as defined in claim 27, wherein said controller is programmed to cause a video image comprising an image of at least five playing cards to be displayed if said game comprises video poker, wherein said controller is programmed to cause a video image comprising an image of a plurality of simulated slot machine reels to be displayed if said game comprises video slots, wherein said controller is programmed to cause a video image comprising an image of a plurality of playing cards to be displayed if said game comprises video blackjack, wherein said controller is programmed to cause a video image comprising an image of a plurality of keno numbers to be displayed if said game comprises video keno, wherein said controller is programmed to cause a video image comprising an image of a bingo grid to be displayed if said game comprises video bingo.

29. A gaming apparatus as defined in claim 26, wherein said display unit comprises at least one mechanical slot machine reel.

30. A gaming apparatus as defined in claim 26, wherein said controller is programmed to receive data relating to a player identification from said wireless communication apparatus, wherein said controller is programmed to establish said bidirectional communication link based on said player identification.

31. A gaming apparatus as defined in claim 26, wherein said controller is programmed to locate said wireless communication apparatus, wherein said controller is programmed to prevent said bidirectional wireless communication link with said wireless communication device if said wireless communication apparatus is not located proximate to said gaming apparatus, wherein said controller is programmed to allow said bidirectional wireless communication link with said gaming apparatus if said wireless communication apparatus is located proximate to said gaming apparatus.

32. A gaming apparatus as defined in claim 26, wherein said controller is programmed to receive data relating to a plurality of gaming functions data via said wireless communication device via said wireless transceiver, said plurality of gaming function data relating to said voice command, wherein said controller is programmed to execute a plurality of gaming functions in response to said plurality of gaming functions data.

33. A gaming apparatus as defined in claim 26, wherein said first gaming function data is encrypted, wherein said controller is programmed to decrypt said first gaming function data.

34. A gaming apparatus as defined in claim 26, wherein said controller is programmed to encrypt said second gaming function data.

35. A gaming apparatus as defined in claim 26, wherein said controller is programmed to record said voice command.

36. A gaming system as defined in claim 26, wherein said controller is programmed to store said recorded voice command as audit trail data.

37. A gaming apparatus as defined in claim 26, wherein said first gaming function data relates to a gaming instruction for said game, wherein said controller is programmed to execute said game instruction.

38. A gaming apparatus as defined in claim 26, wherein said first gaming function data relates to a financial transaction, wherein said controller is programmed to execute said financial transaction.

39. A gaming apparatus as defined in claim 26, wherein said first gaming function data relates to a drink order, wherein said controller is programmed to transmit data relating to said drink order.

40. A gaming apparatus as defined in claim 26, wherein said first gaming function data relates to a food order, wherein said controller is programmed to transmit data relating to said food order.

41. A gaming apparatus as defined in claim 26, wherein said first gaming function data relates to a reservation request, wherein said controller is programmed to transmit data relating to said reservation request.

42. A gaming apparatus as defined in claim 26, wherein said first gaming function data relates to a request for assistance, wherein said controller is programmed to transmit data relating to said request for assistance.

43. A gaming apparatus as defined in claim 26, wherein said first gaming function data relates to an authorized access request, wherein said controller is programmed to grant access to one or more of the following: a maintenance function of said gaming apparatus or a service function of said gaming apparatus.

44. A gaming apparatus as defined in claim 26, wherein said controller is programmed to receive player identification data from said wireless communication device via said wireless transceiver, wherein said controller is programmed to cause one or more of the following: cause said display unit to generate a display relating to said player identification or cause said gaming apparatus to transmit an audio message relating to said player identification to said wireless communication device.

45. A gaming apparatus as defined in claim 26, wherein said controller is programmed to receive player preference data from said wireless communication device via said wireless transceiver, wherein said controller is programmed to cause one or more of the following: cause said display unit to generate a display relating to said player preference or cause said gaming apparatus to transmit an audio message relating to said player preference to said wireless communication device.

46. A gaming apparatus as defined in claim 26, wherein said second gaming function data relates to one of the following: confirmation of said execution of said first gaming function, said outcome, said value payout, financial information, or a promotion.

47. A gaming apparatus as defined in claim 26, wherein said controller is programmed to receive player identification data from said wireless communication device via said wireless transceiver, wherein said controller is programmed to transmit data relating to said gaming apparatus location to a network computer.

48. A gaming apparatus as defined in claim 26, wherein said controller is programmed to determine if said wireless communication device is in proximity to said wireless transceiver, wherein said controller is programmed to terminate said bidirectional communication link if said wireless communication device is not in proximity to said wireless transceiver.

49. A gaming apparatus as defined in claim 26, wherein said controller is programmed to execute said first gaming function in accordance with a status associated with a user of said wireless communication apparatus.

50. A gaming apparatus comprising a plurality of gaming apparatuses as defined in claim 26, said gaming apparatuses being interconnected to form a network of gaming apparatuses.

51. A gaming apparatus as defined in claim 50, wherein said gaming apparatuses are interconnected via the Internet.

52. A gaming communication apparatus comprising:

a microphone;

a wireless transceiver;

a controller operatively coupled to said microphone and said wireless transceiver, said controller comprising a processor and a memory operatively coupled to said processor, said first controller being programmed to: determine based on voice characteristic of a human voice whether to initiate a bidirectional wireless communication link with a gaming apparatus when in proximity to said gaming apparatus, wherein said gaming apparatus is operable for determining an outcome for a game of chance receive a voice command in a human voice prior to establishing said bidirectional wireless communication link, wherein said voice command relates to a first gaming function, authenticating said human voice by comparing a voice characteristic of said human voice to a predetermined voice characteristic of said human voice stored for authentication of said human voice, prevent said bidirectional wireless communication link with said gaming apparatus if said voice characteristic of said human voice does not correspond to said predetermined voice characteristic of said human voice, allow said bidirectional wireless communication link with said gaming apparatus if said voice characteristic of said human voice command corresponds to said predetermined voice characteristic of said human voice transmit data relating to said first gaming function to said gaming apparatus via said wireless transceiver, and receive data relating to a second gaming function from said gaming apparatus via said wireless transceiver.

53. A gaming system as defined in claim 52, wherein said controller is programmed to be calibrated to cause said controller to relate said voice command to said first gaming function data.

54. A gaming system as defined in claim 52, wherein said voice command relates to a plurality of gaming functions, wherein said controller is programmed to transmit data relating to said plurality of gaming functions to said gaming apparatus via said wireless transceiver.

55. A gaming communication apparatus as defined in claim 52, wherein said voice command comprises a particular language and wherein said controller is programmed to recognize said language.

56. A gaming system as defined in claim 52, wherein said controller is programmed to distinguish said voice command from sounds unrelated to said voice command.

57. A gaming communication apparatus as defined in claim 52, wherein said controller is programmed to encrypt said first gaming function data.

58. A gaming communication apparatus as defined in claim 52, wherein said second gaming function data is encrypted, wherein said controller is programmed to decrypt said second gaming function data.

59. A gaming communication apparatus as defined in claim 52, wherein said controller is programmed to record said voice command.

60. A gaming system as defined in claim 59, wherein said controller is programmed to store said recorded voice command as audit trail data.

61. A gaming communication apparatus as defined in claim 52, wherein said first gaming function data relates to one of the following: a gaming instruction, a financial transaction, a drink order, a food order or a reservation request.

62. A gaming communication apparatus as defined in claim 52, wherein said controller is programmed to transmit data relating to a player identification to said gaming apparatus via said wireless transceiver.

63. A gaming communication apparatus as defined in claim 62, wherein said controller is programmed to receive data relating to an audio message relating to said player identification from said gaming apparatus.

64. A gaming communication apparatus as defined in claim 52, wherein said controller is programmed to transmit data relating to a player preference to said gaming apparatus via said wireless transceiver.

65. A gaming communication apparatus as defined in claim 64, wherein said controller is programmed to receive data relating to an audio message relating to said player preference from said gaming apparatus.

66. A gaming communication apparatus as defined in claim 52, wherein said first gaming function data relates to one of the following: a drink order, a food order, a reservation request, a request for assistance, or an authorized access request.

67. A gaming communication apparatus as defined in claim 52, wherein said second gaming function data relates to one of the following: confirmation of an execution of said first gaming function, a game outcome, a value payout associated with said game outcome, an advertisement, financial information, or a promotion.

68. A gaming communication apparatus as defined in claim 52, wherein said controller is programmed to transmit data relating to said first gaming function in accordance with a status associated with a user of said gaming communication apparatus.

* * * * *